US011677330B2

(12) United States Patent
Inomata et al.

(10) Patent No.: US 11,677,330 B2
(45) Date of Patent: Jun. 13, 2023

(54) POWER CONVERSION DEVICE, POWER CONVERSION SYSTEM, AND POWER CONVERSION METHOD

(71) Applicant: KABUSHIKI KAISHA YASKAWA DENKI, Kitakyushu (JP)

(72) Inventors: Kentaro Inomata, Kitakyushu (JP); Akira Yamazaki, Kitakyushu (JP); Masato Higuchi, Kitakyushu (JP); Hidenori Hara, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 112 days.

(21) Appl. No.: 17/243,922

(22) Filed: Apr. 29, 2021

(65) Prior Publication Data

US 2021/0249971 A1 Aug. 12, 2021

Related U.S. Application Data

(63) Continuation of application No. PCT/JP2018/040740, filed on Nov. 1, 2018.

(51) Int. Cl.
*H02M 7/493* (2007.01)
*H02M 5/458* (2006.01)
*H02M 1/00* (2006.01)

(52) U.S. Cl.
CPC .......... *H02M 7/493* (2013.01); *H02M 5/458* (2013.01); *H02M 1/0043* (2021.05)

(58) Field of Classification Search
CPC ...... H02M 7/493; H02M 1/088; H02M 5/458; H02M 7/497; H02M 7/501

See application file for complete search history.

(56) References Cited

U.S. PATENT DOCUMENTS

| 5,436,823 A | 7/1995 | Araki |
| 2009/0115355 A1* | 5/2009 | Oyobe .................... H02P 27/08 318/34 |

(Continued)

FOREIGN PATENT DOCUMENTS

| JP | H04-021365 A | 1/1992 |
| JP | 3226609 B2 | 11/2001 |

(Continued)

OTHER PUBLICATIONS

Japanese Office Action dated Mar. 22, 2022, in Japanese Patent Application No. 2020-554715 (with unedited computer-generated English translation), 8 pages.

(Continued)

*Primary Examiner* — Alex Torres-Rivera
(74) *Attorney, Agent, or Firm* — Oblon, McClelland, Maier & Neustadt, L.L.P.

(57) ABSTRACT

A power conversion device connected in parallel to a second power conversion device including power conversion circuitry that performs power conversion by changing a connection state between first multiple lines on a primary side and second multiple lines on a secondary side, baseline selection circuitry that selects one of the second multiple lines on the secondary side as a baseline and partial modulation control circuitry that controls the power conversion circuitry to maintain a state in which the baseline is connected to one of the first multiple lines on the primary side and to change a connection state between other second multiple lines on the secondary side and the first multiple lines on the primary side, wherein the baseline selection circuitry switches a line selected as the baseline based on a switching timing used by second baseline selection circuitry of the second power conversion device to select a second baseline.

17 Claims, 16 Drawing Sheets

(56) References Cited

U.S. PATENT DOCUMENTS

| | | | | |
|---|---|---|---|---|
| 2015/0145462 A1* | 5/2015 | Ulrich | ............... | H02M 5/458 |
| | | | | 363/37 |
| 2017/0331395 A1* | 11/2017 | Kanazawa | ......... | H02M 7/5395 |
| 2018/0006547 A1* | 1/2018 | Mori | .................... | H02M 1/088 |
| 2018/0269771 A1* | 9/2018 | Mori | ................. | H02M 1/0043 |

FOREIGN PATENT DOCUMENTS

| | | | |
|---|---|---|---|
| JP | 2004-364351 A | 12/2004 | |
| JP | 2008-512079 A | 4/2008 | |
| JP | 2011-211841 A | 10/2011 | |
| JP | 4833983 B2 | 12/2011 | |
| WO | WO 2006/025782 A1 | 3/2006 | |

OTHER PUBLICATIONS

International Search Report dated Dec. 18, 2018 in PCT/JP2018/040740, filed Nov. 1, 2018, with English translation, 5 pages.

* cited by examiner

POWER CONVERSION DEVICE, POWER CONVERSION SYSTEM, AND POWER CONVERSION METHOD

CROSS-REFERENCE TO RELATED APPLICATIONS

The present application is a continuation of and claims the benefit of priority to International Patent Application No. PCT/JP2018/040740, filed Nov. 1, 2018, the entire contents of which are incorporated herein by reference.

BACKGROUND OF THE INVENTION

Field of the Invention

The present disclosure relates to a power conversion device, a power conversion system, and a power conversion method.

Description of Background Art

Japanese Patent Application Laid-Open Publication No. 2011-211841 described a control method of a power conversion device for parallel operation. The control method includes: a first 2-arm control step in which a switching operation is fixed with one phase among three phases and PWM control is performed with the other two phases; a 3-arm control step in which, after the first 2-arm control step, PWM control is performed with the three phases for a predetermined time period; and a second 2-arm control step in which, after the 3-arm control step, a switching operation of a phase different from the phase with which the switching operation is fixed in the first 2-arm control step is fixed and PWM control is performed with the other two phases. The entire contents of this publication are incorporated herein by reference.

SUMMARY OF THE INVENTION

According to one aspect of the present invention, a power conversion device connected in parallel to a second power conversion device includes power conversion circuitry that performs power conversion by changing a connection state between first multiple lines on a primary side and second multiple lines on a secondary side, baseline selection circuitry that selects one of the second multiple lines on the secondary side as a baseline, and partial modulation control circuitry that controls the power conversion circuitry to maintain a state in which the baseline is connected to one of the first multiple lines on the primary side and to change a connection state between other second multiple lines on the secondary side and the first multiple lines on the primary side. The baseline selection circuitry further switches a line selected as the baseline based on a switching timing used by second baseline selection circuitry of the second power conversion device to select a second baseline.

According to another aspect of the present invention, a power conversion method includes, in a first power conversion device connected in parallel to a second power conversion device, performing power conversion by causing power conversion circuitry to change a connection state between first multiple lines on a primary side and second multiple lines on a secondary side, selecting one of the second multiple lines on the secondary side as a baseline, and causing the power conversion circuitry to perform partial modulation including maintaining a state in which the baseline is connected to one of the first multiple lines on the primary side and changing a connection state between other second multiple lines on the secondary side and the first multiple lines on the primary side. The selecting includes switching a first line selected as the baseline based on a switching timing of a second line selected as a second baseline by the second power conversion device.

According to yet another aspect of the present invention, a non-transitory computer readable medium has stored thereon a program that when executed by processing circuitry causes the processing circuitry to implement a power conversion method including, in a first power conversion device connected in parallel to a second power conversion device, instructing performance of power conversion by causing power conversion circuitry to change a connection state between first multiple lines on a primary side and second multiple lines on a secondary side, instructing selection of one of the second multiple lines on the secondary side as a baseline, and causing the power conversion circuitry to perform partial modulation including maintaining a state in which the baseline is connected to one of the first multiple lines on the primary side and changing a connection state between other second multiple lines on the secondary side and the first multiple lines on the primary side. The selection includes switching a first line selected as the baseline based on a switching timing of a second line selected as a second baseline by the second power conversion device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
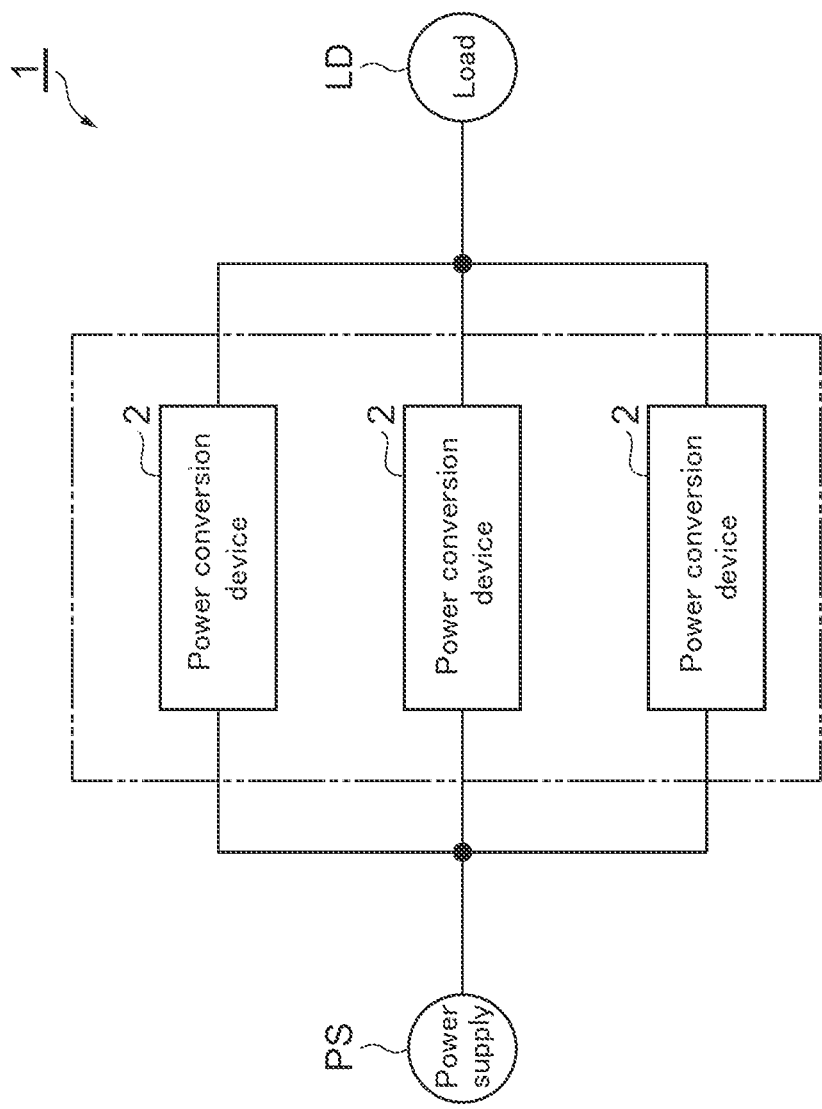
FIG. 1 is a schematic diagram of a power conversion system according to a first embodiment.

Embodiments will now be described with reference to the accompanying drawings, wherein like reference numerals designate corresponding or identical elements throughout the various drawings.

In the following, embodiments are described in detail with reference to the drawings. In the description, the same elements or elements having the same functions are denoted using the same reference numeral symbols, and redundant description is omitted.

1. First Embodiment

1.1 Power Conversion System

A power conversion system 1 illustrated in FIG. 1 is a system for performing power conversion between a power supply (PS) side such as a power system and a load (LD) side such as an electric motor. The term "power conversion" means conversion of a power form. A power form can include the number of lines, whether it is a DC current or an AC current, a voltage (voltage amplitude), a current (current amplitude), a frequency, and the like.

The power conversion system 1 includes at least two power conversion devices 2. At least two power conversion devices 2 are connected to each other in parallel between the power supply (PS) and the load (LD) using wiring. In other words, each power conversion device 2 is connected to the power supply (PS) and the load (LD), and is connected in parallel to the other power conversion devices 2. The power conversion devices 2 perform power conversion between the power supply (PS) side and the load (LD) side. For example, the power conversion devices 2 perform power conversion between three-phase AC power on the power supply (PS) side and three-phase AC power on the load (LD) side. The total number of the power conversion devices 2 included in the power conversion system 1 is not particularly limited. FIG. 1 illustrates a case where the power conversion system 1 includes three power conversion devices 2. FIG. 1 illustrates that multiple power conversion devices 2 are connected in parallel via wiring having an inductance component and a resistance component. However, a reactor (inductor) having an inductance component and a resistance component may be provided between the power conversion devices 2 and the power supply (PS), and a reactor (inductor) having an inductance component and a resistance component may be provided between the power conversion devices 2 and the load (LD). In other words, the multiple power conversion devices 2 may be connected in parallel to each other via a reactor on at least one of the power supply (PS) side and the load (LD) side.

1.2 Power Conversion Device

Figure 2:
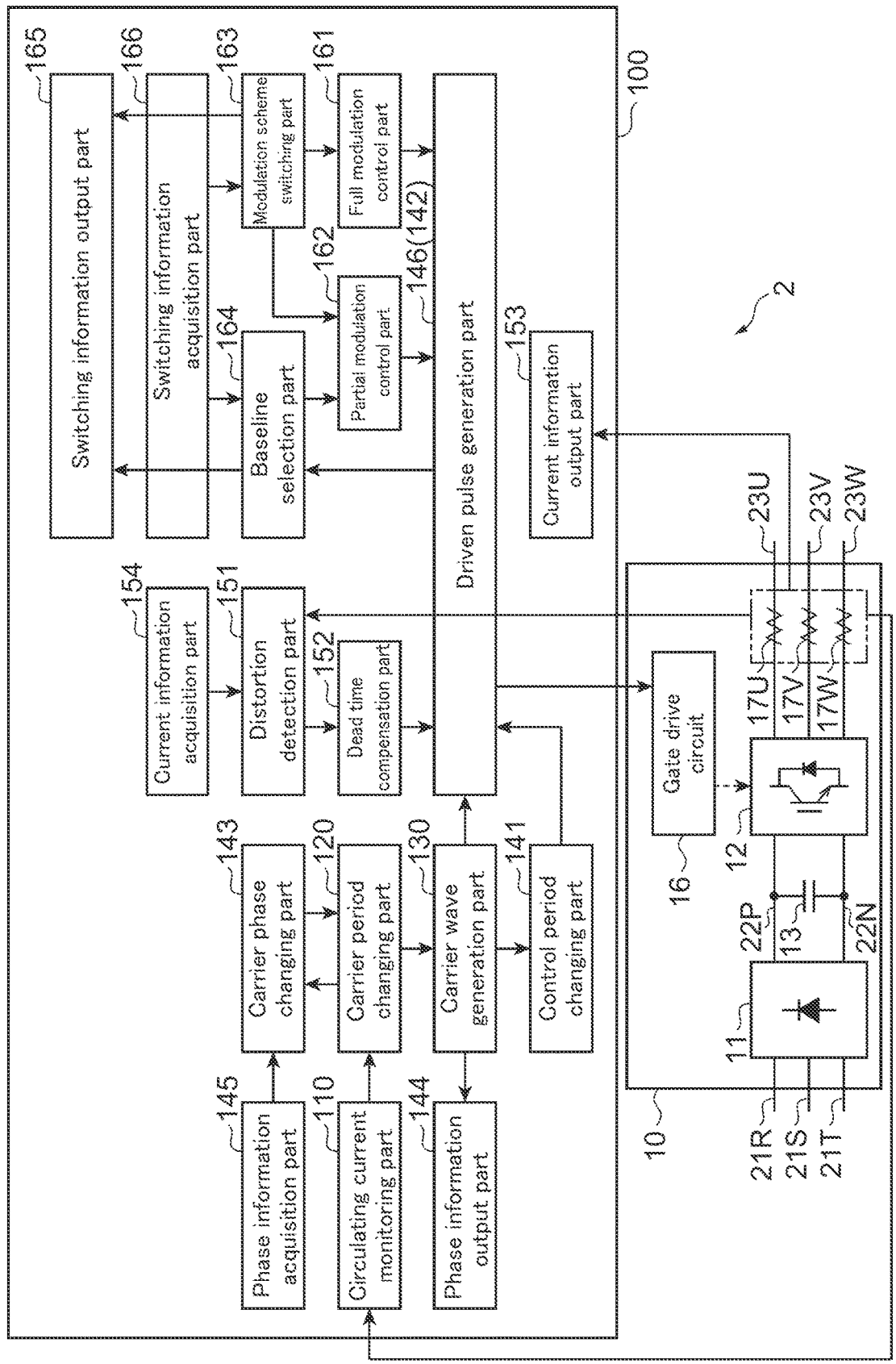
FIG. 2 is a schematic diagram illustrating a structure of a power conversion device.

As illustrated in FIG. 2, a power conversion device 2 includes a power conversion circuit 10 and a control circuit 100. The power conversion circuit 10 includes a rectifier circuit 11, an inverter circuit 12, a capacitor 13, a gate drive circuit 16, and current sensors (17U, 17V, 1W).

The power conversion circuit 10 (power conversion part) includes the rectifier circuit 11, the inverter circuit 12, the capacitor 13, and the gate drive circuit 16. The rectifier circuit 11 is, for example, a diode bridge circuit, and rectifies three-phase AC power of lines (21R, 21S, 21T) connected to the power supply (PS) and outputs the rectified power to lines (22P, 22N) (DC bus lines). The capacitor 13 is connected between the lines (22P, 22N) and smoothes a DC voltage between the lines (22P, 22N).

The inverter circuit 12 performs power conversion between DC power of the lines (22P, 22N) and three-phase AC power of lines (23U, 23V, 23W) connected to the load (LD) such that a voltage and a current of the lines (23U, 23V, 23W) respectively follow a voltage command value and a current command value. The inverter circuit 12 performs power conversion by changing a connection state between the lines (22P, 22N) and the lines (23U, 23V, 23W). Changing a connection state means changing which one of the lines (22P, 22N) each of the lines (23U, 23V, 23W) is connected to. Connection states include a state in which each of the lines (23U, 23V, 23W) is not connected to any one of the lines (22P, 22N).

For example, the inverter circuit 12 includes multiple switching elements, and changes the connection state between the lines (22P, 22N) and the lines (23U, 23V, 23W) by switching ON/OFF of each of the switching elements. The switching elements are each, for example, a power MOSFET (Metal Oxide Semiconductor Field Effect Transistor) or an IGBT (Insulated Gate Bipolar Transistor), and each switch ON/OFF according to a gate drive signal.

The gate drive circuit 16 generates a gate drive signal for ON/OFF switching according to a pulse signal from the control circuit 100, and outputs the gate drive signal to the switching elements of the inverter circuit 12. The current sensors (17U, 17V, 17W) respectively detect the currents of the lines (23U, 23V, 23W).

The power conversion part of the power conversion device 2 is not limited to an inverter circuit. The power conversion part of the power conversion device 2 may be any circuit as long as the circuit performs power conversion by pulse modulation. Examples of the power conversion part other than an inverter circuit include a H-bridge circuit, a 2-level inverter circuit, a multi-level inverter circuit, a modular multi-level conversion circuit, a matrix converter circuit, a PWM converter circuit, a 120-degree energizing converter circuit, and the like. The matrix converter circuit does not have the rectifier circuit 11 and the capacitor 13. The PWM converter circuit and the 120-degree energizing converter circuit do not have the rectifier circuit 11. AC lines (corresponding to the lines (23U, 23V, 23W)) of the PWM converter circuit and the 120 degree energizing converter circuit are connected to the power supply (PS), and DC lines (corresponding to the lines (22P, 22N)) of the PWM converter circuit and the 120 degree energizing converter circuit are connected to the load (LD).

The control circuit 100 is structured to execute: generating a carrier wave; generating a pulse signal synchronized with the carrier wave; causing the inverter circuit 12 to generate power according to a width of the pulse signal; acquiring a monitoring value corresponding to a circulating current between this power conversion device 2 and other power conversion devices 2; and, changing a carrier period so as to reduce the circulating current based on the monitoring value acquired while the inverter circuit 12 is generating the drive power. It is possible that the acquisition of a monitoring value and the changing of a carrier period based on a monitoring value are executed in the control circuits 100 of all the power conversion devices 2 or are not executed in the control circuit 100 of any one of the power conversion devices 2.

The control circuit 100 may be structured to further execute: detecting a current or voltage distortion caused by a dead time of the inverter circuit 12 based on one current index value corresponding to a current output by the inverter circuit 12 and a current output by the inverter circuit 12 of another power conversion device 2; and correcting a width of a pulse signal according to the detected current or voltage distortion.

As illustrated in FIG. 2, the control circuit 100 includes, as functional structural components (hereinafter, referred to as "functional modules"), a carrier wave generation part 130, a pulse generation part 142, a circulating current monitoring part 110, and a carrier period changing part 120.

The carrier wave generation part 130 generates a carrier wave. For example, the carrier wave generation part 130 generates a triangular wave as a carrier wave. The pulse generation part 142 generates a pulse signal synchronized with a carrier wave and outputs the pulse signal to the gate drive circuit 16. That is, the pulse generation part 142 generates, in synchronization with a carrier wave, a pulse signal that causes the inverter circuit 12 to change a connection state between the lines (22P, 22N) on a primary side and the lines (23U, 23V, 23W) on a secondary side.

For example, the pulse generation part 142 includes a driven pulse generation part 146. The drive pulse generation part 146 generates a pulse signal for drive power output. The drive power is power for causing the load (LD) to operate. Causing the load (LD) to operate means mechanically or electrically changing a state of the load (LD). For example, when the load (LD) is a rotary electric motor, rotating a rotation shaft of the electric motor is included in causing the load (LD) to operate. The drive pulse generation part 146 compares a carrier wave with a voltage command value for driving the load (LD), and generates a pulse signal with a period during which the voltage command value exceeds the carrier wave as an H level and a period during which the carrier wave exceeds the voltage command value as an L level. As a result, a pulse signal synchronized with a timing at which the carrier wave and the voltage command value match each other is generated, and a pulse width thereof is changed according to a change in the voltage command value.

The circulating current monitoring part 110 acquires a monitoring value corresponding to a circulating current between this power conversion device 2 and other power conversion devices 2. The circulating current is a current that flows to the other power conversion device 2 side without flowing to the load (LD) side. The monitoring value may be any value as long as it is a value that changes according to a change in the circulating current. Acquisition of a monitoring value includes calculation of a monitoring value based on an acquired value. For example, the circulating current monitoring part 110 acquires as a monitoring value a difference between currents generated by the inverter circuit 12 at a first timing and a second timing set within one period of a carrier wave. The circulating current monitoring part 110 may acquire as a monitoring value a difference between currents generated by the inverter circuit 12 at the first timing and the second timing, which have a phase difference of half the period of the carrier wave.

The circulating current monitoring part 110 may acquire as a monitoring value a difference between currents generated by the inverter circuit 12 at a timing corresponding to a peak of the carrier wave and a timing corresponding to a bottom of the carrier wave as the difference between the currents generated by the inverter circuit 12 at the first timing and the second timing. The timing corresponding to a peak of the carrier wave is a timing at which a value of a triangular wave becomes a maximum (that is, a timing corresponding to a top of a peak). The timing corresponding to a bottom of the carrier wave is a timing at which a value of a triangular wave becomes a minimum (that is, a timing corresponding to a lowest point of a bottom).

The carrier period changing part 120 changes the period of the carrier wave so as to reduce the circulating current based on the monitoring value acquired by the circulating current monitoring part 110 while the inverter circuit 12 is generating the drive power. The carrier period changing part 120 may be structured to change a period of a carrier wave generated by the carrier wave generation part 130 without changing a waveform.

When a period of a carrier wave at one peak is changed, a subsequent peak becomes out of phase. Specifically, when the period at one peak becomes shorter, the phase of a subsequent peak advances, and when the period at one peak becomes longer, the phase of a subsequent peak is delayed. That is, changing the period of a carrier wave also includes changing the phase of the carrier wave. When the period at one peak is changed and the period at the subsequent peak is not changed, only the phase of the subsequent peak is changed. That is, the carrier period changing part 120 can also be used for changing only the phase.

Figure 3:
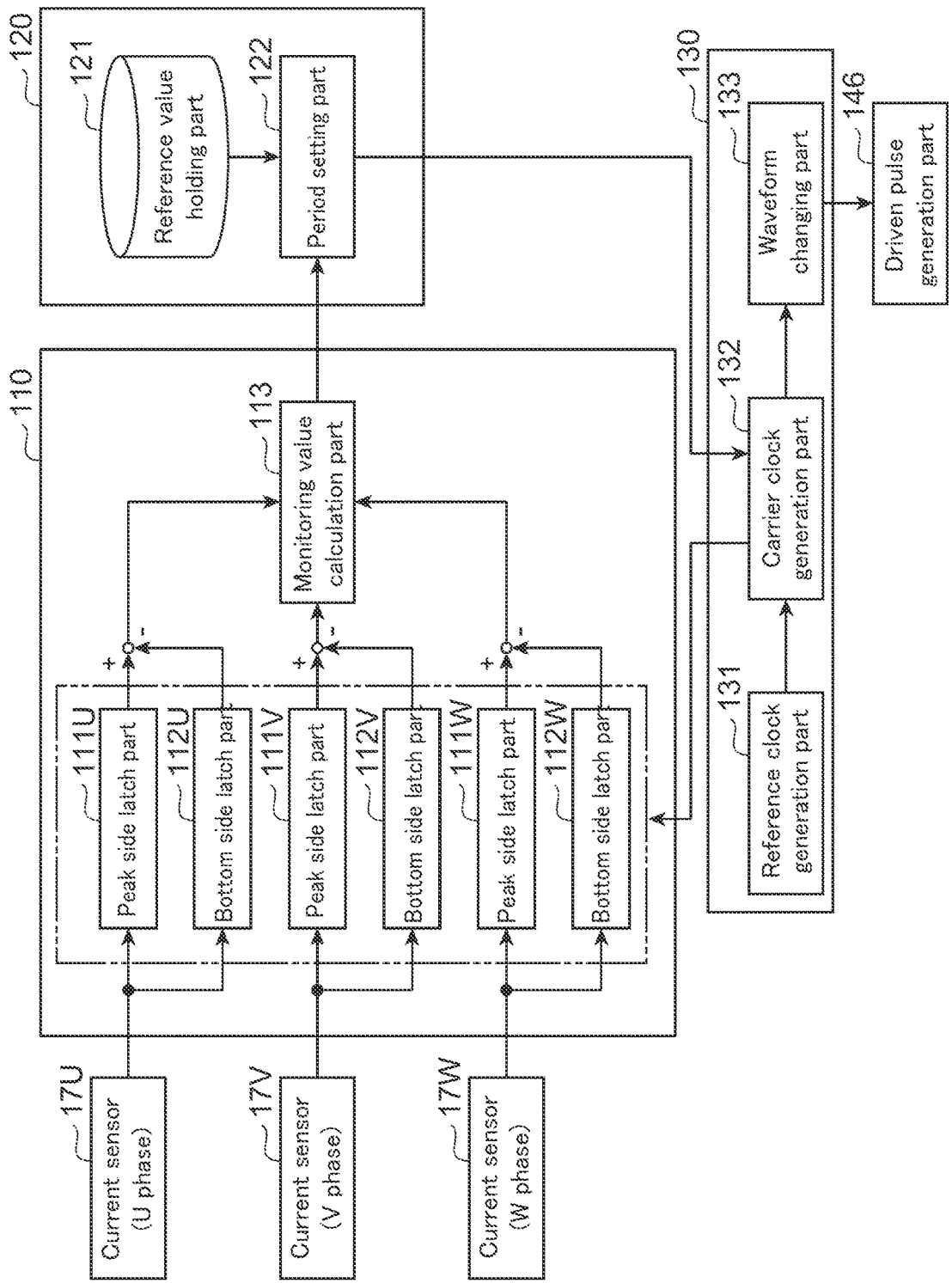
FIG. 3 is a schematic diagram illustrating structures of a circulating current monitoring part, a carrier period adjusting part, and a carrier wave generation part in more detail.

FIG. 3 is a schematic diagram illustrating structures of the carrier wave generation part 130, the circulating current monitoring part 110, and the carrier period changing part 120 in more detail. As illustrated in FIG. 3, the carrier wave generation part 130 includes, as more subdivided functional modules, a reference clock generation part 131, a carrier clock generation part 132, and a waveform changing part 133.

The reference clock generation part 131 generates reference clock pulses for measuring passage of time. By counting the number of reference clock pulses, an elapsed time period can be quantified.

The carrier clock generation part 132 alternately repeats counting up reference clock pulses generated by the reference clock generation part 131 to a compare match count value (to be described later) and counting down reference clock pulses to zero, and outputs an H level signal during counting up and an L level signal during counting down. As a result, a pulse signal (hereinafter referred to as a "carrier clock pulse") having a period corresponding to twice the compare match count value is output.

The waveform changing part 133 changes the waveform of the carrier clock pulse from a rectangle to a triangle. For example, the waveform changing part 133 linearly increases an output during a time period in which the carrier clock pulse is at an H level and linearly decreases an output during a time period in which the carrier clock pulse is at an L level. As a result, a triangular wave having a period corresponding to twice the compare match count value is generated as a carrier wave. A counter value of the carrier clock generation part 132 may be directly used as a carrier wave. In this case, the waveform changing part 133 can be omitted.

The circulating current monitoring part 110 includes, as more subdivided functional modules, peak side latch parts (111U, 111V, 111W), bottom side latch parts (112U, 112V, 112W), and a monitoring value calculation part 113.

The peak side latch part (111U) acquires and holds a current value (hereinafter referred to as "a peak U-phase current value") detected by a current sensor (17U) at a timing corresponding to a peak of a carrier wave. The peak side latch part (111V) acquires and holds a current value (hereinafter referred to as "a peak V-phase current value")

detected by a current sensor (17V) at a timing corresponding to a peak of a carrier wave. The peak side latch part (111W) acquires and holds a current value (hereinafter referred to as "a peak W-phase current value") detected by a current sensor (17W) at a timing corresponding to a peak of a carrier wave.

The bottom side latch part (112U) acquires and holds a current value (hereinafter referred to as "a bottom U-phase current value") detected by the current sensor (17U) at a timing corresponding to a bottom of a carrier wave. The bottom side latch part (112V) acquires and holds a current value (hereinafter referred to as "a bottom V-phase current value") detected by the current sensor (17V) at a timing corresponding to a bottom of a carrier wave. The bottom side latch part (112W) acquires and holds a current value (hereinafter referred to as "a bottom W-phase current value") detected by the current sensor (17W) at a timing corresponding to a bottom of a carrier wave.

The monitoring value calculation part 113 calculates the above-described monitoring value by summing a difference between the peak U-phase current value and the bottom U-phase current value, a difference between the peak V-phase current value and the bottom V-phase current value, and a difference between the peak W-phase current value and the bottom W-phase current value. The monitoring value calculated in this way corresponds to a difference between a zero-phase current value at a timing corresponding to a peak of the carrier wave (hereinafter, referred to as a "peak zero-phase current value") and a zero-phase current value at a timing corresponding to the bottom of the carrier wave (hereinafter referred to as a "bottom zero-phase current value").

Figure 4:
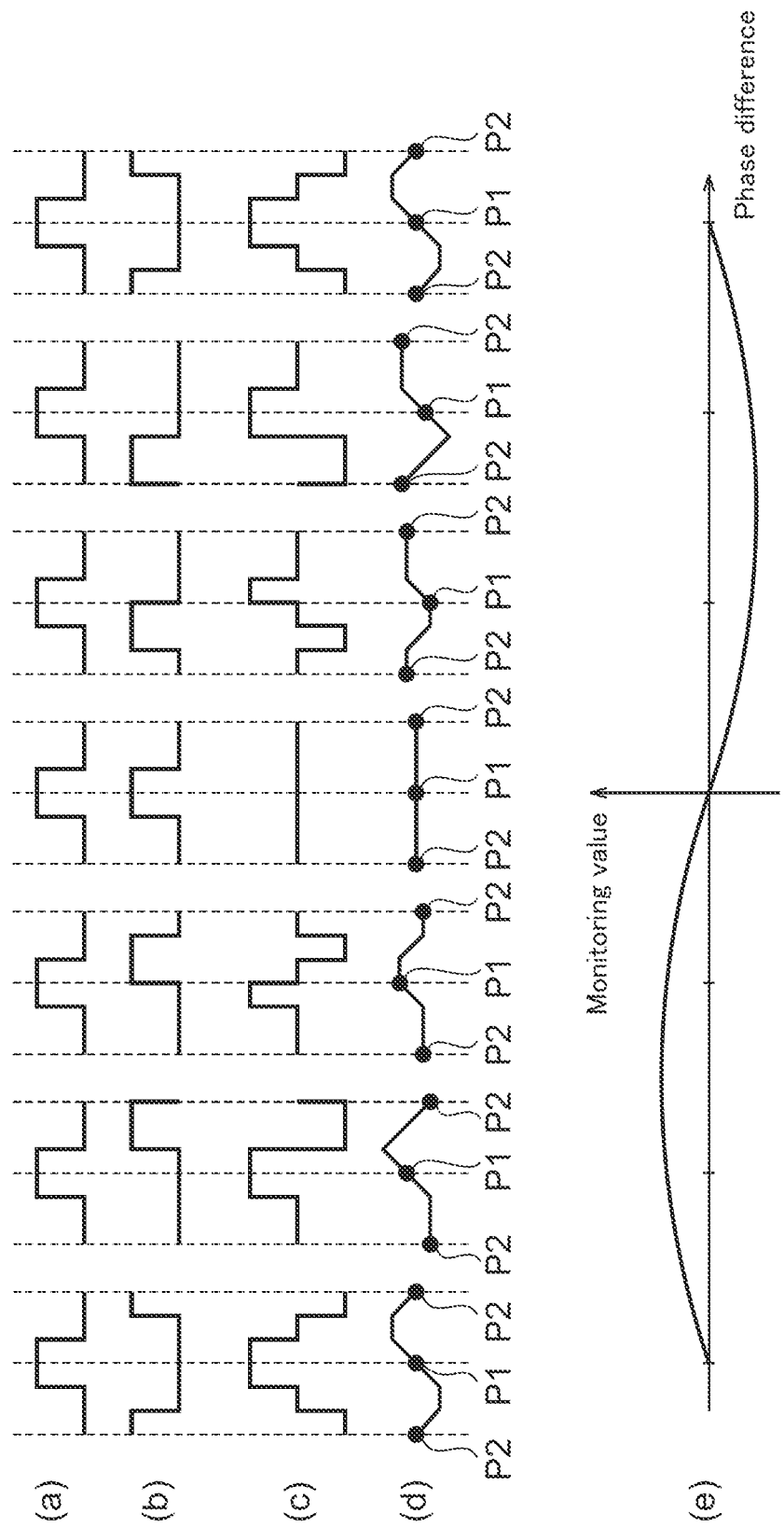
FIG. 4 illustrates a relationship between a phase difference of a pulse command and a monitoring value.

FIG. 4(*a*) is a graph illustrating a pulse signal in a power conversion device 2 (hereinafter referred to as "this device"). FIG. 4(*b*) is a graph illustrating a pulse signal in another power conversion device 2 (hereinafter referred to as "the other device"). FIG. 4(*c*) is a graph illustrating a difference between the pulse signal of this device and the pulse signal of the other device. FIG. 4(*d*) is a graph illustrating a zero-phase current value of this device.

In each of FIGS. 4(*a*)-4(*d*), the graph at the center illustrates a case where pulse signals are synchronized between this device and the other device. The first graph on the left side of the center illustrates a case where the phase of the pulse signal of the other device is delayed by 60 degrees as compared to the phase of the pulse signal of this device. The second graph on the left side of the center illustrates a case where the phase of the pulse signal of the other device is delayed by 120 degrees as compared to the phase of the pulse signal of this device. The third graph on the left side of the center illustrates a case where the phase of the pulse signal of the other device is delayed by 180 degrees as compared to the phase of the pulse signal of this device. Similarly, the first graph on the right side of the center illustrates a case where the phase of the pulse signal of the other device is advanced by 60 degrees as compared to the phase of the pulse signal of this device. The second graph on the right side of the center illustrates a case where the phase of the pulse signal of the other device is advanced by 120 degrees as compared to the phase of the pulse signal of this device. The third graph on the right side of the center illustrates a case where the phase of the pulse signal of the other device is advanced by 180 degrees as compared to the phase of the pulse signal of this device.

In FIG. 4(*d*), P1 indicates a bottom zero-phase current value of this device, and P2 indicates a peak zero-phase current value of this device. FIG. 4(*e*) is a graph illustrating a relationship between the phase difference of the pulse signals (the phase difference between the pulse signal of the other device and the pulse signal of this device) and the monitoring value (the difference between the peak zero-phase current value and the bottom zero-phase current value). As illustrated in FIG. 4(*e*), the monitoring value is a negative value when the phase difference is a positive value, and the monitoring value is a positive value when the phase difference is a negative value.

The case where the phase difference is a positive value corresponds to the case where the phase of the pulse signal of the other device is advanced as compared to the phase of the pulse signal of this device. The case where the phase difference is a negative value corresponds to the case where the phase of the pulse signal of the other device is delayed as compared to the phase of the pulse signal of this device. In this way, there is a correlation between the phase difference and the monitoring value. When the monitoring value is a positive value, the monitoring value can be reduced by delaying the phase of the pulse signal of this device, and when the monitoring value is a negative value, the monitoring value can be reduced by advancing the phase of the pulse signal of this device.

As described above, the pulse signal is synchronized with the carrier wave. Therefore, when the monitoring value is a positive value, the monitoring value is reduced by delaying the phase of the carrier wave of this device, and when the monitoring value is a negative value, the monitoring value can be reduced by advancing the phase of the carrier wave of this device.

FIG. 4(*e*) is a graph of a case where a zero-phase current is determined mainly by an inductance component. As is clear from this graph, when the difference between the currents generated by the inverter circuit 12 at the first timing and the second timing, which have a phase difference of half the period of the carrier wave, is acquired as the monitoring value, a circulating current due to the phase difference (−180-+180 degrees) can be detected within a detection range covering about one period. Further, by setting the first timing and the second timing, which have a phase difference of half the period, to peaks and bottoms of the carrier wave, a circulating current that does not include a switching noise can be detected at a timing at which a level change of a pulse signal does not occur, and further, the monitoring value can be increased to increase detection sensitivity.

When a zero-phase current is determined mainly by a resistance component, the waveform of the zero-phase current is close to the waveform of the difference of the pulse signals. In such a case, it is effective to arrange the first timing and the second timing immediately after level changes of the pulse signals. A main factor that determines the zero-phase current may change between powering and regeneration. In such a case, the first timing and the second timing may be changed depending on whether it is powering or regeneration. Whether it is powering or regeneration can be determined based on a potential difference or the like between the lines (22P, 22N).

When the power conversion system 1 includes three or more power conversion devices 2, a monitoring value calculated in this device is determined according to a difference between a pulse signal of this device and an average value of pulse signals of the multiple other devices. That is, a relationship between this device and the multiple other devices can be equated with a relationship between this device and one virtual other device defined as follows.

Virtual other device: Another device of which a pulse signal is an average value of pulse signals of the multiple other devices.

Therefore, when the power conversion system 1 includes three or more power conversion devices 2, a phase difference between a pulse signal of the virtual other device and a pulse signal of this device and a monitoring value of this device are correlated as illustrated in FIG. 4(e). Therefore, even when the power conversion system 1 includes three or more power conversion devices 2, when the monitoring value is a positive value, the monitoring value can be reduced by delaying the phase of the pulse signal of this device, and when the monitoring value is a negative value, the monitoring value can be reduced by advancing the phase of the pulse signal of this device.

Returning to FIG. 3, the carrier period changing part 120 includes, as more subdivided functional modules, a reference value holding part 121 and a period setting part 122. The reference value holding part 121 stores a reference value of the above-described compare match count value (hereinafter, referred to as a "reference count value"). The period setting part 122 changes the above-described compare match count value based on the monitoring value calculated by the monitoring value calculation part 113.

As described above, the carrier clock generation part 132 outputs a carrier clock pulse having a period corresponding to twice the compare match count value, and the waveform changing part 133 generates as a carrier wave a triangular wave having a period corresponding to twice the compare match count value. Therefore, changing the compare match count value is equivalent to changing the period of the carrier wave. For example, the period setting part 122 calculates a count correction value based on the monitoring value, and calculates a compare match count value by adding the count correction value to the reference count value. A counter value of the carrier clock generation part 132 may be directly used as a carrier wave. In this case, the waveform changing part 133 can be omitted.

As an example, the period setting part 122 calculates a count correction value by performing proportion calculation, proportion and integration calculation, proportion, integration and differentiation calculation, or the like with respect to the monitoring value. When the monitoring value is a positive value, since the count correction value is also a positive value, the compare match count value is larger than the reference count value. Therefore, the period of the carrier wave at a peak corresponding to the compare match count value becomes longer, and the phase of a subsequent peak is delayed. As a result, an absolute value of the monitoring value is reduced. When the monitoring value is a negative value, since the count correction value is also a negative value, the compare match count value is smaller than the reference count value. Therefore, the period of the carrier wave at a peak corresponding to the compare match count value becomes shorter, and the phase of a subsequent peak is advanced. As a result, the absolute value of the monitoring value is reduced.

A method for calculating the count correction value by the period setting part 122 is not limited to proportion calculation or the like. For example, the period setting part 122 may keep the absolute value of the count correction value constant, and only set a sign of the count correction value according to a sign of the monitoring value. In this case, the period of the carrier wave is changed by so-called Bang-Bang control.

Returning to FIG. 2, the control circuit 100 may be structured to repeat various control processes in a control period. For example, the pulse generation part 142 may be structured to adjust a width of a pulse signal at a timing according to a control period. The timing according to a control cycle is a timing determined based on a start time of each control cycle repeated in the control period. In this case, the control circuit 100 may further include a control period changing part 141.

The control period changing part 141 changes a control period according to a change of the period of the carrier wave by the carrier period changing part 120 such that the period of the carrier wave and the control period are synchronized. When the control period does not change even when the period of the carrier wave changes, there is a possibility that, even after the periods of the carrier waves of this device and the other device are aligned, a shift in control period remains and a shift in timing for changing a width of a pulse signal occurs. When a shift in the timing for changing a width of a pulse signal occurs, a moment when the widths of the pulse signals of this device and the other device are different from each other occurs, and a circulating current is generated. On the other hand, the control period changing part 141 changes the control period, and as a result, a shift in the timing for changing a pulse width is unlikely to occur.

The control circuit 100 may be structured to further execute changing a phase of a carrier wave such that a carrier wave phase difference between this device and the other device is reduced before the inverter circuit 12 starts generating drive power. For example, the control circuit 100 may set this device as a master or slave with respect to the other device, and, when this device is used as a master, may output phase information corresponding to the phase of the carrier wave of this device to the other device, and when this device is used as a slave, may change the phase of the carrier wave based on phase information acquired from the other device.

Specifically, the control circuit 100 includes a phase information output part 144, a phase information acquisition part 145, and a carrier phase changing part 143. The phase information output part 144 is used when this device is used as a master with respect to the other device. For example, the phase information output part 144 outputs the above-described phase information to the other device. For example, when the carrier clock pulse of the carrier wave generation part 130 switches from an L level to an H level (or from an H level to an L level), the phase information output part 144 transmits information to this effect as the phase information to the other device.

The phase information acquisition part 145 and the carrier phase changing part 143 are used when this device is used as a slave with respect to the other device. For example, the phase information acquisition part 145 acquires the above-described phase information from the phase information output part 144 of the other device.

The carrier phase changing part 143 changes the phase of a carrier wave such that a carrier wave phase difference between this device and the other device is reduced before the inverter circuit 12 starts generating drive power. The carrier phase changing part 143 may change the phase of the carrier wave such that the phase difference is reduced to less than half the period of the carrier wave. For example, the carrier phase changing part 143 changes the phase of the carrier wave such that the phase difference is reduced based on the phase information acquired by the phase information acquisition part 145.

As an example, the carrier phase changing part 143 calculates a phase correction value for setting the phase difference to zero, and changes a compare match count value for one peak of a carrier wave by adding a half of the phase correction value to the above-described reference count value. When a peak of a carrier wave is generated with the compare match count value after the change, the carrier phase changing part 143 resets the compare match count value to the reference count value. By this processing, the phase correction value is added to the period of one peak of the carrier wave, and the phase of a subsequent peak is changed according to the phase correction value.

For example, after the phase information acquisition part 145 acquires the phase information, the carrier phase changing part 143 acquires a time when a carrier clock pulse of the carrier wave generation part 130 is switched from an L level to an H level (or from an H level to an L level). Hereinafter, this time is referred to as "the time of the carrier wave top part of this device." Further, the carrier phase changing part 143 calculates a time when a carrier clock pulse of the carrier wave generation part 130 of the other device is switched from an L level to an H level (or from an H level to an L level). Hereinafter, this time is referred to as "the time of the carrier wave top part of the other device."

For example, the carrier phase changing part 143 calculates the time of the carrier wave top part of the other device by subtracting a communication time (communication time between this device and the other device) from the time when the phase information acquisition part 145 acquires the phase information. Then, the carrier phase changing part 143 calculates the above-described phase correction value by subtracting the time of the carrier wave top part of this device from the time of the carrier wave top part of the other device.

The control circuit 100 may be structured to perform so-called dead time compensation based on one current index value corresponding to a current output by the inverter circuit 12 and a current output by the inverter circuit 12 of the other power conversion device 2. Although detailed description is omitted, in the control of the inverter circuit 12, in order to prevent a short circuit between the lines (22P, 22N), a small period (dead time) is provided in which each of the lines (23U, 23V, 23W) is not connected to any one of the lines (22P, 22N). The dead time compensation is to correct the above-described voltage command value in order to compensate for a distortion (for example, a decrease) in an output current or an output voltage caused by the dead time.

For example, the control circuit 100 further includes a current information output part 153, a current information acquisition part 154, a distortion detection part 151, and a dead time compensation part 152. The current information output part 153 acquires information about a current output by the inverter circuit 12 of this device (hereinafter, this current is referred to as "the current of this device") from the current sensors (17U, 17V, 17W) and outputs the information to the other device. The current information acquisition part 154 acquires information about a current output by the inverter circuit 12 of the other device (hereinafter, this current is referred to as "the current of the other device") from the current information output part 153 of the other device.

The distortion detection part 151 detects a current or voltage distortion caused by the dead time based on one current index value corresponding to the current of this device and the current of the other device. For example, the distortion detection part 151 acquires information about the current of this device from the current sensors (17U, 17V, 17W), acquires information about the current of the other device from the current information acquisition part 154, and calculates an average value of the current of this device and the current of the other device as the above-described one current index value. Then, the distortion detection part 151 detects a current or voltage distortion based on the current index value.

The current index value may be any value as long as the value corresponds to both the current of this device and the current of the other device, and does not necessarily have to be an average value of the current of this device and the current of the other device. For example, the current index value may be a total value of the current of this device and the current of the other device.

The dead time compensation part 152 corrects the width of the above-described pulse signal according to the current or voltage distortion detected by the distortion detection part 151. For example, the dead time compensation part 152 calculates a voltage correction value by subjecting the current or voltage distortion value calculated by the distortion detection part 151 to proportional calculation, proportional and integral calculation, proportional, integral and differential calculation, or the like. Then, the dead time compensation part 152 adds the voltage correction value to the voltage command value. According to this, the width of the above-described pulse signal is corrected. A specific method for calculating the voltage correction value differs depending on a type of a circuit to be applied (for example, a 2-level inverter circuit, a multi-level inverter circuit, and matrix converter circuit), and the like.

The control circuit 100 may be structured to further execute: selecting one of the lines on the secondary side as a baseline; and controlling the inverter circuit 12 so as to maintain a state in which the baseline is connected to one of the lines on the primary side and to change a connection state between the other lines on the secondary side and the multiple lines on the primary side (hereafter, this is referred to as "partial modulation control").

The control circuit 100 may be structured to further execute: controlling the inverter circuit 12 so as to change a connection state between all the lines on the secondary side and the multiple lines on the primary side (hereinafter this is referred to as "full modulation control"); and switching between the partial modulation control and the full modulation control. For example, the control circuit 100 further includes a full modulation control part 161, a baseline selection part 164, a partial modulation control part 162, and a modulation scheme switching part 163.

The full modulation control part 161 performs the above-described full modulation control. For example, the full modulation control part 161 controls the inverter circuit 12 so as to change a connection state between all the lines (23U, 23V, 23W) on the secondary side and the lines (22P, 22N) on the primary side.

The baseline selection part 164 selects one of the lines on the secondary side as the baseline (base phase). For example, the baseline selection part 164 selects one of the lines (23U, 23V, 23W) on the secondary side as the baseline. The baseline selection part 164 switches a line to be selected as the baseline according to a change in the above-described voltage command value (voltage command value on the secondary side) or the like. Hereinafter, switching a line to be selected as the baseline is referred to as "base switching." The baseline selection part 164 may perform base switching at a timing according to the above-described control period. The baseline selection part 164 may select any one of the lines on the secondary side as the baseline based on the phase of the above-described current command value (current command value on the secondary side). The partial modulation control part 162 performs the above-described partial modulation control. The partial modulation control part 162 executes controlling the inverter circuit 12 so as to maintain a state in which the baseline selected by the baseline selection part 164 is connected to one of the lines (22P, 22N) on the primary side and to change a connection state between the remaining two lines of the lines (23U, 23V, 23W) (the two lines other than the baseline) and the lines (22P, 22N).

The "primary side" and the "secondary side" are merely terms used for convenience to distinguish between one side and the other side of the inverter circuit 12. In this example, the lines (22P, 22N) on the power supply (PS) side are on the "primary side" and the lines (23U, 23V, 23W) on the load (LD) side are on the "secondary side." However, the present invention is not limited to this. Depending on the type of the power conversion part, it is also possible that the lines on the power supply (PS) side are considered as being on the "secondary side" and the lines on the load (LD) side are considered as being on the "primary side." For example, when the power conversion part is a PWM converter circuit, it is possible that the lines (lines (23U, 23V, 23W)) on the power supply (PS) are considered as being on the "secondary side," and the lines (lines (22P, 22N)) on the load (LD) are considered as being on the "primary side." Further, when the power conversion part is a matrix converter circuit, the lines (lines (21R, 21S, 21T)) on the power supply (PS) side are considered as being on the "primary side."

The modulation scheme switching part 163 switches a modulation scheme of the inverter circuit 12 to either the modulation of the full modulation control part 161 or the modulation of the partial modulation control part 162. The modulation scheme switching part 163 switches the modulation scheme according to the magnitude of the above-described voltage command value, the frequency of the voltage command value, and the like. Hereinafter, switching the modulation scheme is referred to as "scheme switching."

Also regarding base switching, the control circuit 100 may set this device as a master or slave with respect to the other device, and, when this device is used as a master, may output information about the timing of base switching to the other device, and when this device is used as a slave, may execute base switching based on information about the timing of base switching acquired from the other device. Also regarding scheme switching, the control circuit 100 may set this device as a master or slave with respect to the other device, and, when this device is used as a master, may output information about the timing of the scheme switching to the other device, and when this device is used as a slave, may execute the scheme switching based on information about the timing of the scheme switching acquired from the other device. For example, the control circuit 100 further includes a switching information output part 165 and a switching information acquisition part 166.

The switching information output part 165 is used when this device is used as a master. The switching information output part 165 acquires information indicating the timing of base switching from the baseline selection part 164 and outputs the information to the other device. The information indicating the timing of base switching may be information indicating that the current time is the timing of base switching (hereinafter, this information is referred to as a "base switching command"), or may be information indicating the timing of base switching after the current time (hereinafter, this information is referred to as "base switching schedule information").

Further, the switching information output part 165 acquires information indicating the timing of scheme switching from the modulation scheme switching part 163 and outputs the information to the other device. The information indicating the timing of scheme switching may be information indicating that the current time is the timing of scheme switching (hereinafter, this information is referred to as a "scheme switching command"), or may be information indicating the timing of scheme switching after the current time (hereinafter, this information is referred to as "scheme switching schedule information").

The switching information acquisition part 166 is used when this device is used as a slave. The switching information acquisition part 166 acquires the information indicating the timing of base switching from the switching information output part 165 of the other device. Further, the switching information acquisition part 166 acquires the information indicating the timing of scheme switching from the switching information output part 165 of the other device.

The control circuit 100 may be structured to switch a line to be selected as the baseline based on the switching timing of the line selected as the baseline by the other device (hereafter, this timing is referred to as the "base switching timing"). The control circuit 100 may be structured to switch the modulation scheme based on the timing at which the other device switches the modulation scheme (hereinafter, this timing is referred to as the "scheme switching timing"). In this case, the control circuit 100 may set this device as a master or slave with respect to the other device, and, when this device is used as a master, may output information about the base switching timing and the scheme switching timing to the other device, and when this device is used as a slave, may determine the base switching timing and the scheme switching timing based on information acquired from the other device.

When the control circuit 100 sets this device as a slave, the baseline selection part 164 performs base switching based on the timing at which the baseline selection part 164 of the other device, which is a master, performs base switching. For example, the baseline selection part 164 performs base switching at a timing synchronized with the timing at which the baseline selection part 164 of the other device performs base switching. The synchronization here means a substantial synchronization, and includes a case where a timing difference is of an error level. The same applies to the following. "A timing difference is of an error level" means that a circulating current caused by this difference is at a negligible level.

When the switching information acquisition part 166 acquires the above-described base switching schedule information, the baseline selection part 164 may perform base switching when a scheduled timing indicated by the base switching schedule information is reached. When the control circuit 100 sets this device as a master, the modulation scheme switching part 163 performs scheme switching based on the magnitude of the voltage command value on the secondary side.

When the control circuit 100 sets this device as a slave, the modulation scheme switching part 163 performs scheme switching based on the timing at which the modulation scheme switching part 163 of the other device, which is a master, performs scheme switching. For example, the modulation scheme switching part 163 performs scheme switching at a timing synchronized with the timing at which the modulation scheme switching part 163 of the other device performs scheme switching.

Figure 5:
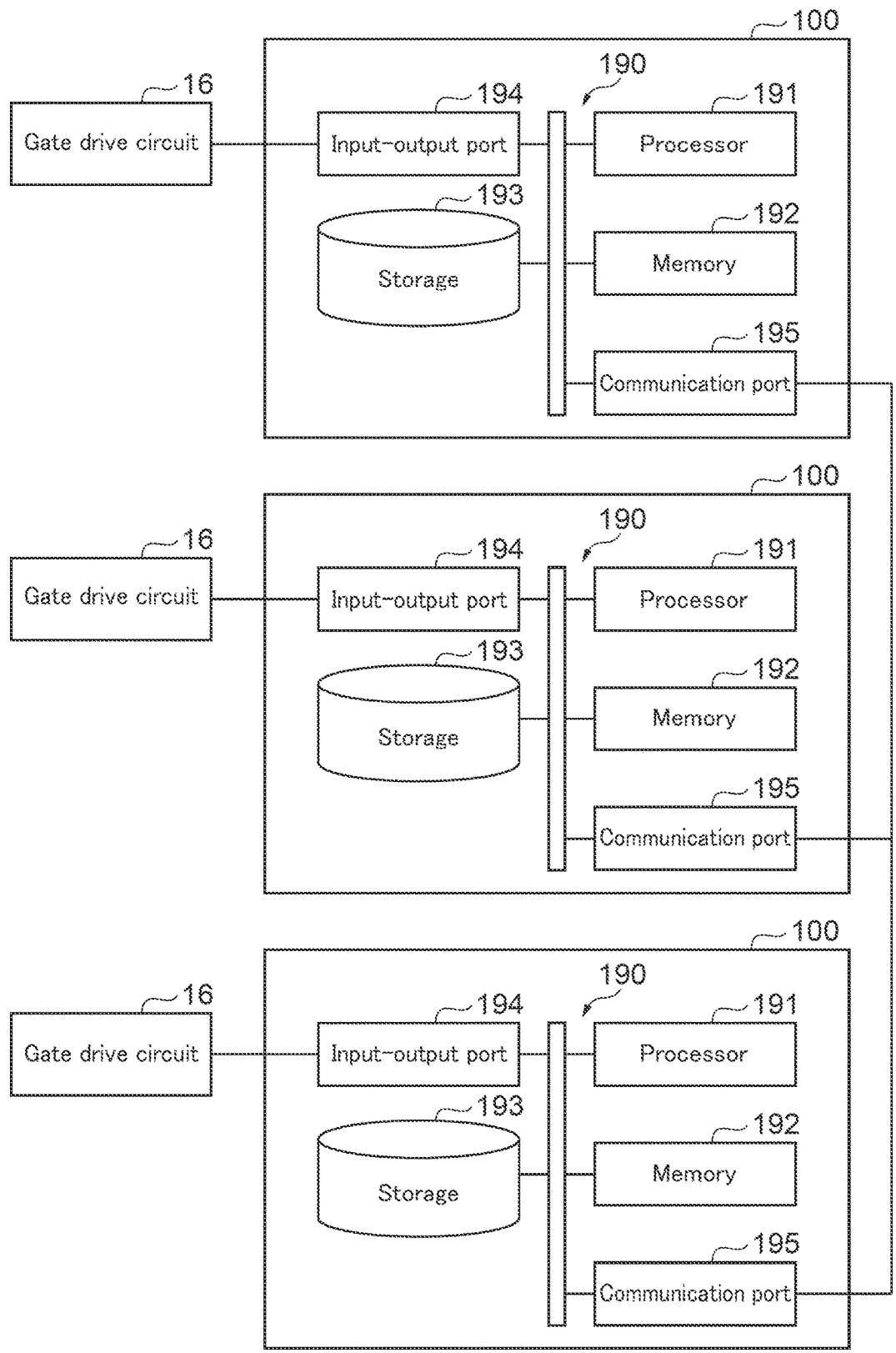
FIG. 5 is a schematic diagram illustrating a hardware configuration of a control part.

FIG. 5 illustrates a hardware structure of the control circuit 100. As illustrated in FIG. 5, the control circuit 100 includes at least one processor 191, a memory 192, a storage 193, an input-output port 194, and a communication port 195.

The storage 193 has a computer-readable storage medium, such as a non-volatile semiconductor memory. The storage medium stores a program for achieving various functions of the control circuit 100. The storage 193 stores a program that causes control circuit 100 to execute: generating a carrier wave; generating a pulse signal synchronized with the carrier wave; causing the inverter circuit 12 to generate power according a width of the pulse signal; acquiring a monitoring value corresponding to a circulating current between this power conversion device 2 and the other power conversion device 2; and changing a carrier period so as to reduce the circulating current based on the monitoring value acquired while the inverter circuit 12 is generating drive power.

The storage 193 may store a program that causes the control circuit 100 to execute: detecting a current or voltage distortion caused by a dead time of the inverter circuit 12 based on one current index value corresponding to a current output by the inverter circuit 12 of this device and a current output by the inverter circuit 12 of the other device; and correcting a width of a pulse signal according to the detected current or voltage distortion. The storage 193 may store a program that causes the control circuit 100 to execute: outputting information about the timing of base switching to the other device; and outputting information about the timing of scheme switching to the other device. The storage 193 may store a program that causes the control circuit 100 to execute: executing base switching based on information about the timing of base switching acquired from the other device; and executing scheme switching based on information about the timing of scheme switching acquired from the other device.

The memory 192 temporarily stores a program loaded from the storage medium of the storage 193 and a calculation result by the processor 191. The processor 191 forms the above-described functional modules by executing the above-described program in cooperation with the memory 192. The input-output port 194 performs input or output an electric signal to or from a gate drive circuit 16 according to a command from the processor 191. The communication port 195 performs information communication with the control circuit 100 of the other device according to a command from the processor 191.

The control circuit 100 is not necessarily limited to achieving the functions by a program. For example, the control circuit 100 may achieve at least some of the functions by a dedicated logic circuit or an ASIC (Application Specific Integrated Circuit) that integrates the logic circuit.

1.3 Power Conversion Method

In the following, as an example of a power conversion method, a drive power output procedure, a carrier wave phase adjustment procedure before the start of a drive power output, a dead time compensation procedure, a master-side base switching procedure, a slave-side base switching procedure, a master-side scheme switching procedure, and a slave-side scheme switching procedure, which are executed by a power conversion device 2 of the power conversion system 1, are described.

Drive Power Output Procedure

The drive power output procedure includes: generating a carrier wave; generating a pulse signal synchronized with the carrier wave; causing the inverter circuit 12 to generate power according to the width of the pulse signal; acquiring a monitoring value corresponding to a circulating current between this device and the other device; and changing a carrier period so as to reduce the circulating current based on the monitoring value acquired while the inverter circuit 12 is generating the drive power.

Figure 6:
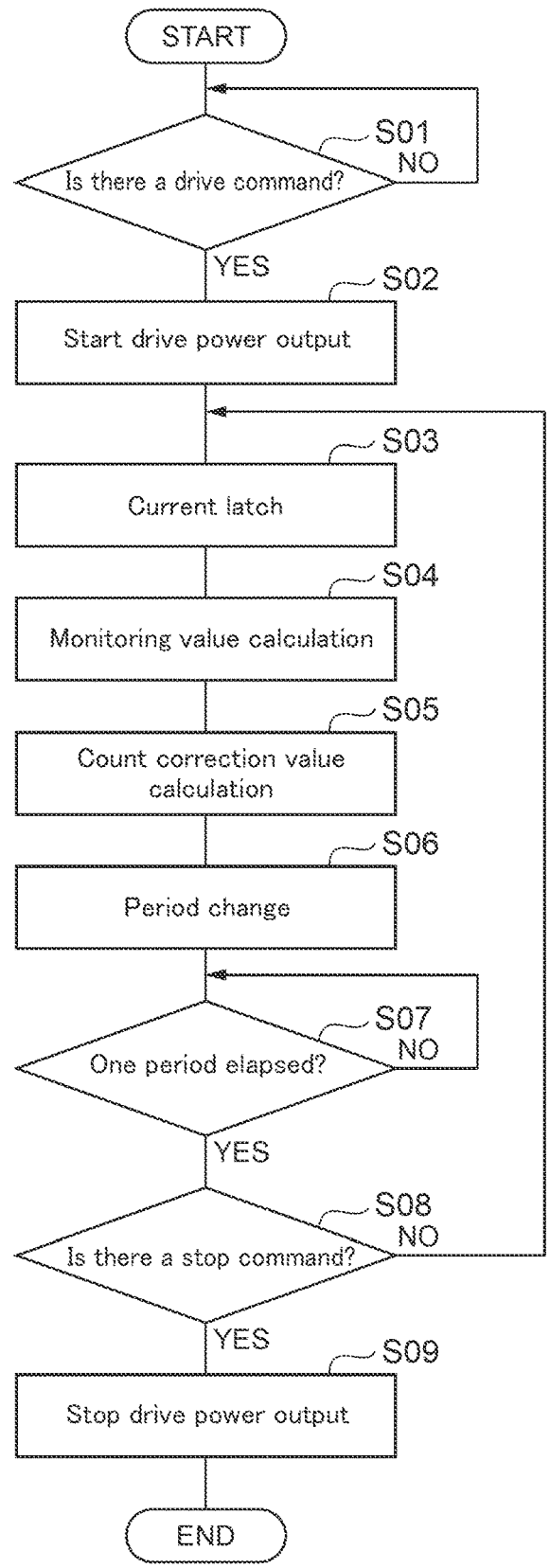
FIG. 6 is a flowchart illustrating a drive power output procedure.

For example, as illustrated in FIG. 6, the control circuit 100 first executes Steps S01, S02, S03, and S04. In Step S01, the drive pulse generation part 146 waits for an input of a drive command. The drive command may be input by a user or may be input from an upper controller. In Step S02, the drive pulse generation part 146 starts to generate a pulse signal for drive power output in synchronization with a carrier wave and output the pulse signal to the gate drive circuit 16. As a result, the inverter circuit 12 starts to output drive power according to the width of the pulse signal. In Step S03, the circulating current monitoring part 110 acquires and holds the above-described peak U-phase current value, the above-described peak V-phase current value, the above-described peak W-phase current value, the above-described bottom U-phase current value, the above-described bottom V-phase current value, and the above-described bottom W-phase current value. In Step S04, the circulating current monitoring part 110 calculates a monitoring value by summing up a difference between the peak U-phase current value and the bottom U-phase current value, a difference between the peak V-phase current value and the bottom V-phase current value, and a difference between the peak W-phase current value and the bottom W-phase current value.

Next, the control circuit 100 executes Steps S05, S06, S07, and S08. In Step S05, the carrier period changing part 120 calculates a count correction value based on the monitoring value. In Step S06, the carrier period changing part 120 changes the compare match count value by adding the count correction value to the above-described reference count value. As a result, the carrier period is changed. In Step S07, the drive pulse generation part 146 waits for the passage of the carrier period. In Step S08, the drive pulse generation part 146 confirms whether or not a stop command has been input. The stop command may be input by a user or may be input from an upper controller.

When it is determined in Step S08 that a stop command has not been input, the control circuit 100 returns the process to Step S03. After that, reducing the circulating current by changing the carrier period according to the monitoring value is repeated.

When it is determined in Step S08 that a stop command has been input, the control circuit 100 executes Step S09. In Step S09, the drive pulse generation part 146 stops outputting to the gate drive circuit 16 the pulse signal for drive power output. As a result, the drive power output procedure is completed.

Phase Adjustment Procedure

The phase adjustment procedure includes changing the phase of a carrier wave such that a carrier wave phase difference between this device and the other device is reduced before the inverter circuit 12 starts generating drive power. For example, the phase adjustment procedure includes: in a master power conversion device 2, outputting phase information corresponding to the phase of the carrier wave of this device to the other device; and, in a slave power conversion device 2, changing the phase of the carrier wave based on phase information acquired from the other device.

Figure 7:
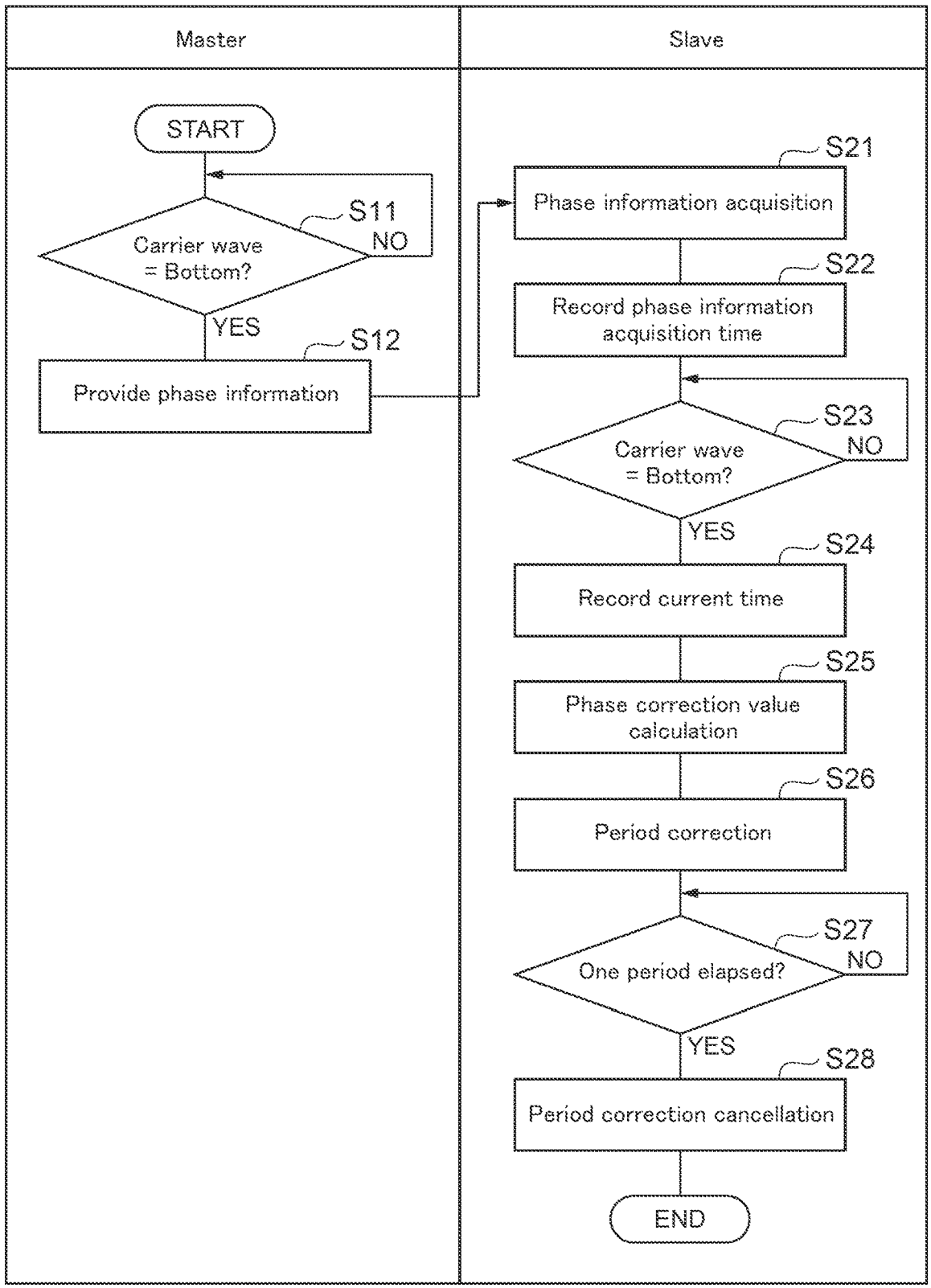
FIG. 7 is a flowchart illustrating a carrier wave phase adjustment procedure before the start of a drive power output.

For example, as illustrated in FIG. 7, the control circuit 100 of the master-side power conversion device 2 executes Steps S11 and S12. In Step S11, the phase information output part 144 waits for a timing at which the above-described carrier clock pulse switches from an L level to an H level (a timing at which the carrier wave becomes a bottom). In Step S12, the phase information output part 144 outputs, to the slave power conversion device 2, information notifying that the carrier clock pulse has switched from an L level to an H level (the carrier wave has become a bottom) as the phase information.

Following this, the control circuit 100 of the slave-side power conversion device 2 executes Steps S21, S22, S23, and S24. In Step S21, the phase information acquisition part 145 acquires the phase information output from the master-side power conversion device 2. In Step S22, the phase information acquisition part 145 records the time when the phase information is acquired. In Step S23, the carrier phase changing part 143 waits for a timing at which the carrier clock pulse switches from an L level to an H level (a timing at which the carrier wave becomes a bottom). In Step S24, the carrier phase changing part 143 records the time when the carrier wave becomes a bottom (hereinafter, this time is referred to as the "time of the carrier wave top part").

Next, the control circuit 100 of the slave-side power conversion device 2 executes Steps S25, S26, S27, and S28. In Step S25, the carrier phase changing part 143 calculates a phase correction value by subtracting the time of the carrier wave top part on the slave side from the time of the carrier wave top part on the master side. The carrier phase changing part 143 calculates the time of the carrier wave top part on the master side by subtracting a communication time (communication time between this device and the other device) from the time when the phase information acquisition part 145 acquires the phase information. In Step S26, the carrier phase changing part 143 changes a compare match count value for one peak of the carrier wave by adding a half of the phase correction value to the above-described reference count value. In Step S27, the carrier phase changing part 143 waits for the passage of the carrier period. In Step S28, the carrier phase changing part 143 resets the compare match count value to the reference count value. As a result, the phase adjustment procedure is completed.

Dead Time Compensation Procedure

The dead time compensation procedure includes: detecting a current or voltage distortion caused by a dead time of the inverter circuit 12 based on one current index value corresponding to the above-described current of this device (the current output by the inverter circuit 12 of this device) and the above-described current of the other device (the current output by the inverter circuit 12 of the other device); and correcting the width of the pulse signal according to the detected current or voltage distortion.

Figure 8:
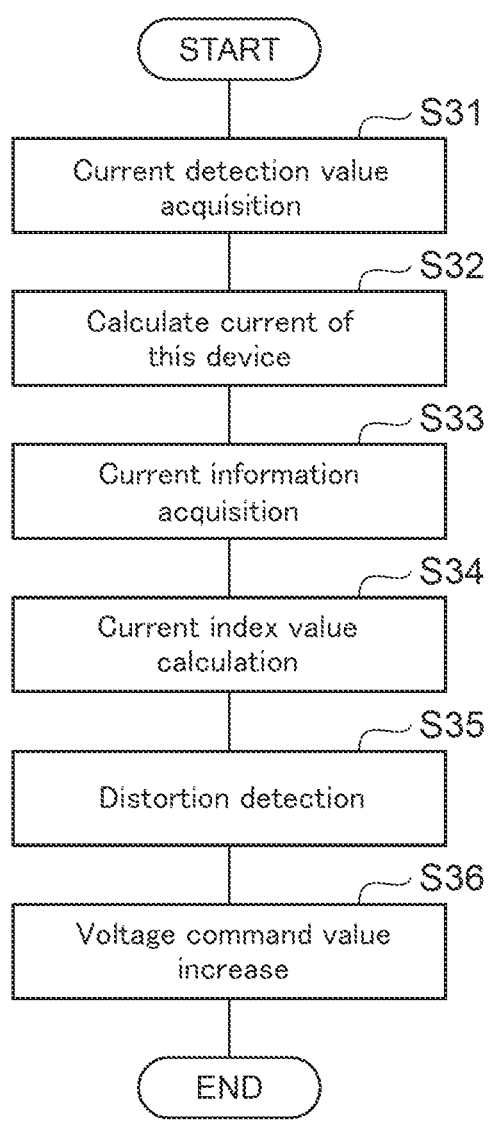
FIG. 8 is a flowchart illustrating a dead time compensation procedure.

As illustrated in FIG. 8, the control circuit 100 executes Steps S31, S32, S33, and S34. In Step S31, the distortion detection part 151 acquires current detection values from the current sensors (17U, 17V, 17W). In Step S32, the distortion detection part 151 synthesizes the detected current values acquired from the current sensors (17U, 17V, 17W) to calculate the current of this device. In Step S33, the current information acquisition part 154 acquires from the current information output part 153 of the other device the current of the other device calculated in the other device in the same way as the current of this device. In Step S34, the distortion detection part 151 calculates the one current index value corresponding to the current of this device and the current of the other device. For example, the distortion detection part 151 calculates an average value of the current of this device and the current of the other device as the above-described one current index value.

Next, the control circuit 100 executes Steps S35 and S36. In Step S35, the distortion detection part 151 detects a current or voltage distortion caused by a dead time of the inverter circuit 12 based on the current index value. In Step S36, the dead time compensation part 152 corrects the width of the above-described pulse signal according to the current or voltage distortion detected by the distortion detection part 151. For example, the dead time compensation part 152 calculates a voltage correction value based on the current or voltage distortion calculated by the distortion detection part 151, and adds or subtracts the result to or from the voltage command value. According to this, the width of the above-described pulse signal is corrected. As a result, the dead time compensation procedure is completed.

Master-Side Base Switching Procedure

The base switching procedure of the master-side power conversion device 2 includes acquiring information indicating the timing of base switching from the baseline selection part 164 and outputting the information to the slave-side power conversion device 2.

Figure 9:
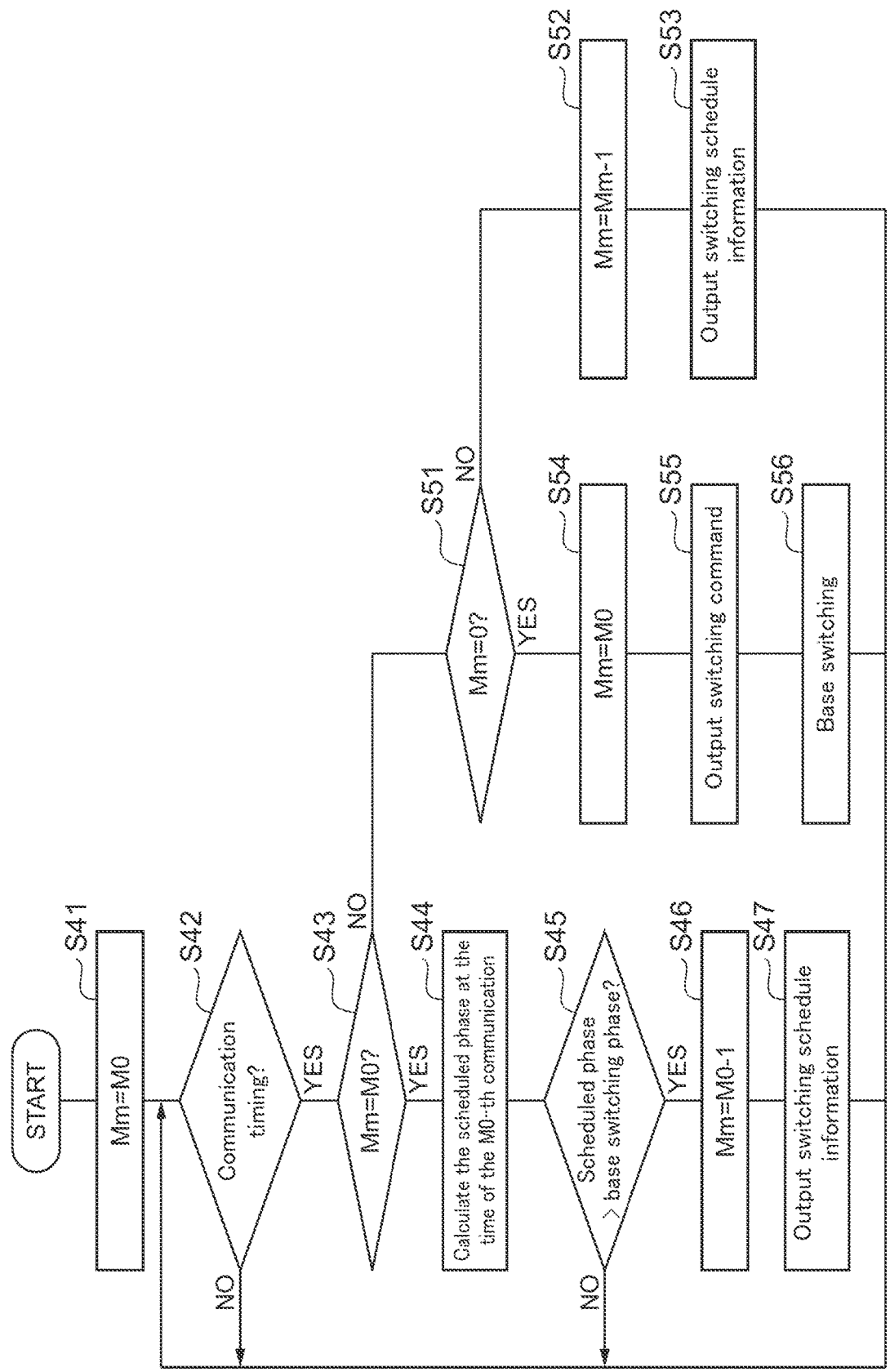
FIG. 9 is a flowchart illustrating a baseline switching procedure in two-phase modulation on a master side.

As illustrated in FIG. 9, the control circuit 100 executes Steps S41, S42, and S43. In Step S41, the switching information output part 165 sets the number of repetitions (Mm) of information transmission to the slave-side power conversion device 2 to an initial value (M0). In Step S42, the switching information output part 165 waits for a communication timing. In Step S43, the switching information output part 165 confirms whether or not the number of repetitions (Mm) is the initial value (M0).

When it is determined in Step S43 that the number of repetitions (Mm) is the initial value (M0), the control circuit 100 executes Steps S44 and S45. In Step S44, the baseline selection part 164 calculates a scheduled phase of a voltage command value at the time of the M0-th communication. For example, the switching information output part 165 calculates the scheduled phase by adding a value obtained by multiplying the frequency of the voltage command value by a communication time of the initial value (M0) times to the current phase of the voltage command value. In Step S45, the baseline selection part 164 confirms whether or not the scheduled phase exceeds a phase with which the baseline should be switched next (hereinafter, this phase is referred to as the "next switching phase").

When it is determined in Step S45 that the scheduled phase has not exceeded the next switching phase, the control circuit 100 returns the process to Step S42. After that, the calculation of the scheduled phase is repeated until the scheduled phase exceeds the next switching phase.

When it is determined in Step S45 that the scheduled phase has exceeded the next switching phase, the control circuit 100 executes Steps S46 and S47. In Step S46, the switching information output part 165 counts down the number of repetitions (Mm) by one. In Step S47, the switching information output part 165 outputs the above-described base switching schedule information to the slave-side power conversion device 2. For example, the switching information output part 165 outputs the current value of the number of repetitions (Mm) as the above-described base switching schedule information. The current value of the number of repetitions (Mm) corresponds to information notifying that a base switching command is output at the time of communication after the number of repetitions (Mm) times. After that, the control circuit 100 returns the process to Step S42.

When it is determined in Step S43 that the number of repetitions (Mm) is not the initial value (M0), the control circuit 100 executes Step S51. In Step S51, the switching information output part 165 confirms whether or not the number of repetitions (Mm) is zero.

When it is determined in Step S51 that the number of repetitions (Mm) is not zero, the control circuit 100 executes Steps S52 and S53. In Step S52, the switching information output part 165 counts down the number of repetitions (Mm) by one. In Step S53, the switching information output part 165 outputs the above-described base switching schedule information to the slave-side power conversion device 2. For example, the switching information output part 165 outputs the current value of the number of repetitions (Mm) as the above-described base switching schedule information. After that, the control circuit 100 returns the process to Step S42. After that, until the number of repetitions (Mm) becomes zero, the countdown of the number of repetitions (Mm) and the output of the base switching schedule information are repeated.

When it is determined in Step S51 that the number of repetitions (Mm) is zero, the control circuit 100 executes Steps S54, S55, and S56. In Step S54, the switching information output part 165 resets the number of repetitions (Mm) to the initial value (M0). In Step S55, the switching information output part 165 outputs the above-described base switching command. In Step S56, the baseline selection part 164 performs base switching. After that, the control circuit 100 returns the process to Step S42. After that, the above procedure is repeated.

Slave-Side Base Switching Procedure

Figure 10:
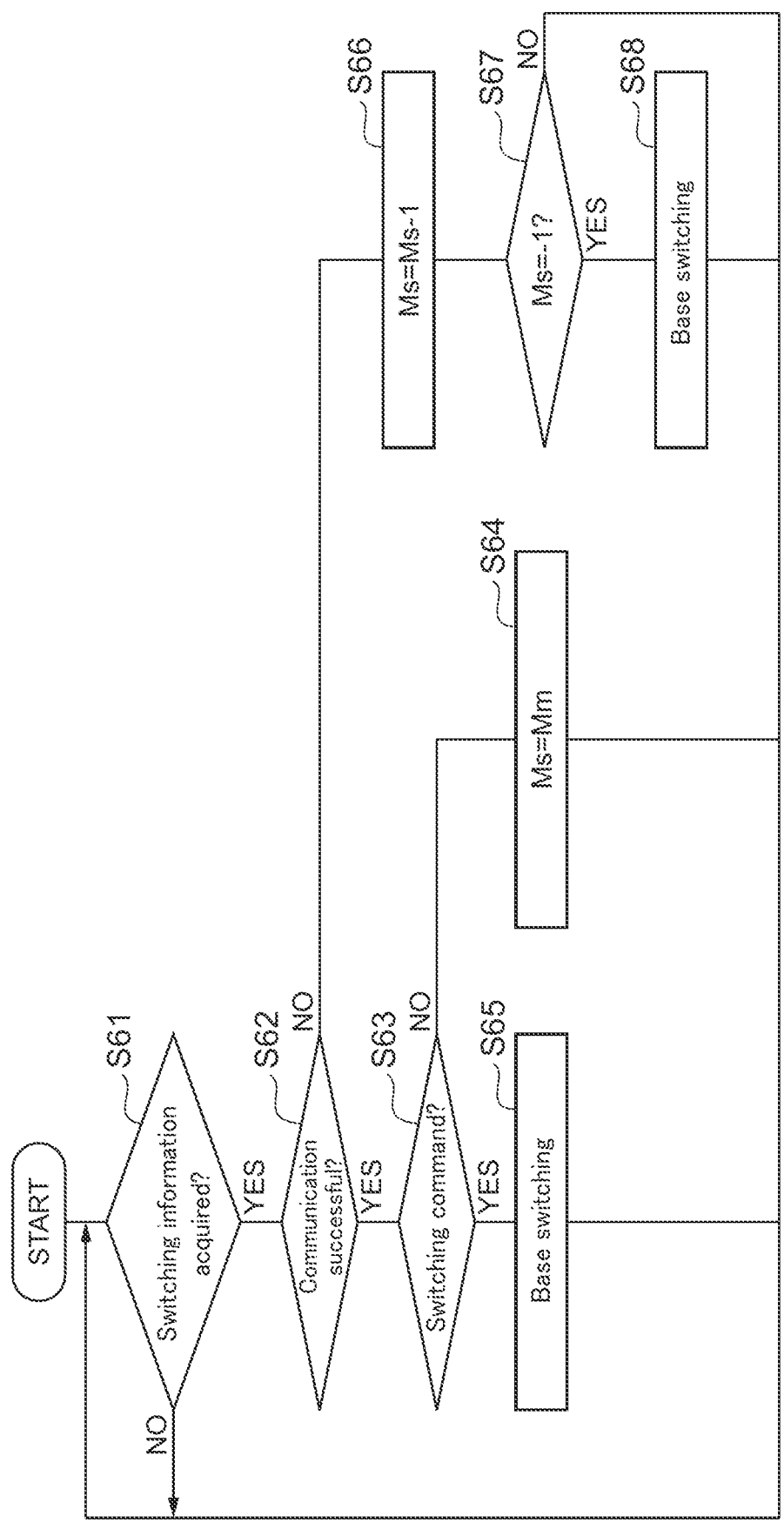
FIG. 10 is a flowchart illustrating a baseline switching procedure in two-phase modulation on a slave side.

The base switching procedure of the slave-side power conversion device 2 includes performing base switching based on the timing at which the master-side power conversion device 2 performs base switching. For example, as illustrated in FIG. 10, the control circuit 100 executes Steps S61 and S62. In Step S61, the switching information acquisition part 166 waits for information about the timing of base switching. In Step S62, the switching information acquisition part 166 confirms whether or not communication is successful. The success or failure of communication can be confirmed by using, for example, a parity bit or the like.

When it is determined in Step S62 that communication is successful, the control circuit 100 executes Step S63. In Step S63, the baseline selection part 164 confirms whether or not the information about the timing of base switching is a base switching command.

When it is determined in Step S63 that the information about the timing of base switching is not a base switching command, the control circuit 100 executes Step S64. In Step S64, the baseline selection part 164 sets the number of repetitions (Ms) of information reception from the master-side power conversion device 2 to the above-described number of repetitions (Mm) of information transmission. After Step S64, the control circuit 100 returns the process to Step S61. After that, every time the reception of the base switching schedule information is successful, update of the number of repetitions (Ms) based on the base switching schedule information is repeated.

When it is determined in Step S63 that the information about the timing of base switching is a base switching command, the control circuit 100 executes Step S65. In Step S65, the baseline selection part 164 immediately performs base switching. After that, the control circuit 100 returns the process to Step S61.

When it is determined in Step S62 that communication is not successful, the control circuit 100 executes Steps S66 and S67. In Step S66, the baseline selection part 164 counts down the number of repetitions (Ms) by one. In Step S67, the baseline selection part 164 confirms whether or not the number of repetitions (Ms) is −1.

When it is determined in Step S67 that the number of repetitions (Ms) is not −1, the control circuit 100 returns the process to Step S61.

When it is determined in Step S67 that the number of repetitions (Ms) is −1, the control circuit 100 executes Step S68. In Step S68, the baseline selection part 164 immediately performs base switching. After that, the control circuit 100 returns the process to Step S61. After that, the above procedure is repeated.

According to the above procedure, when the base switching schedule information is successfully received even once and the number of repetitions (Ms) of information reception is set to the number of repetitions (Mm) of information transmission in Step S64, the base switching is performed according to the base switching schedule information by counting down the number of repetitions (Ms) of information reception. Therefore, it is possible to perform base switching with high reliability according to the timing of base switching on the master side.

Master-Side Scheme Switching Procedure

Figure 11:
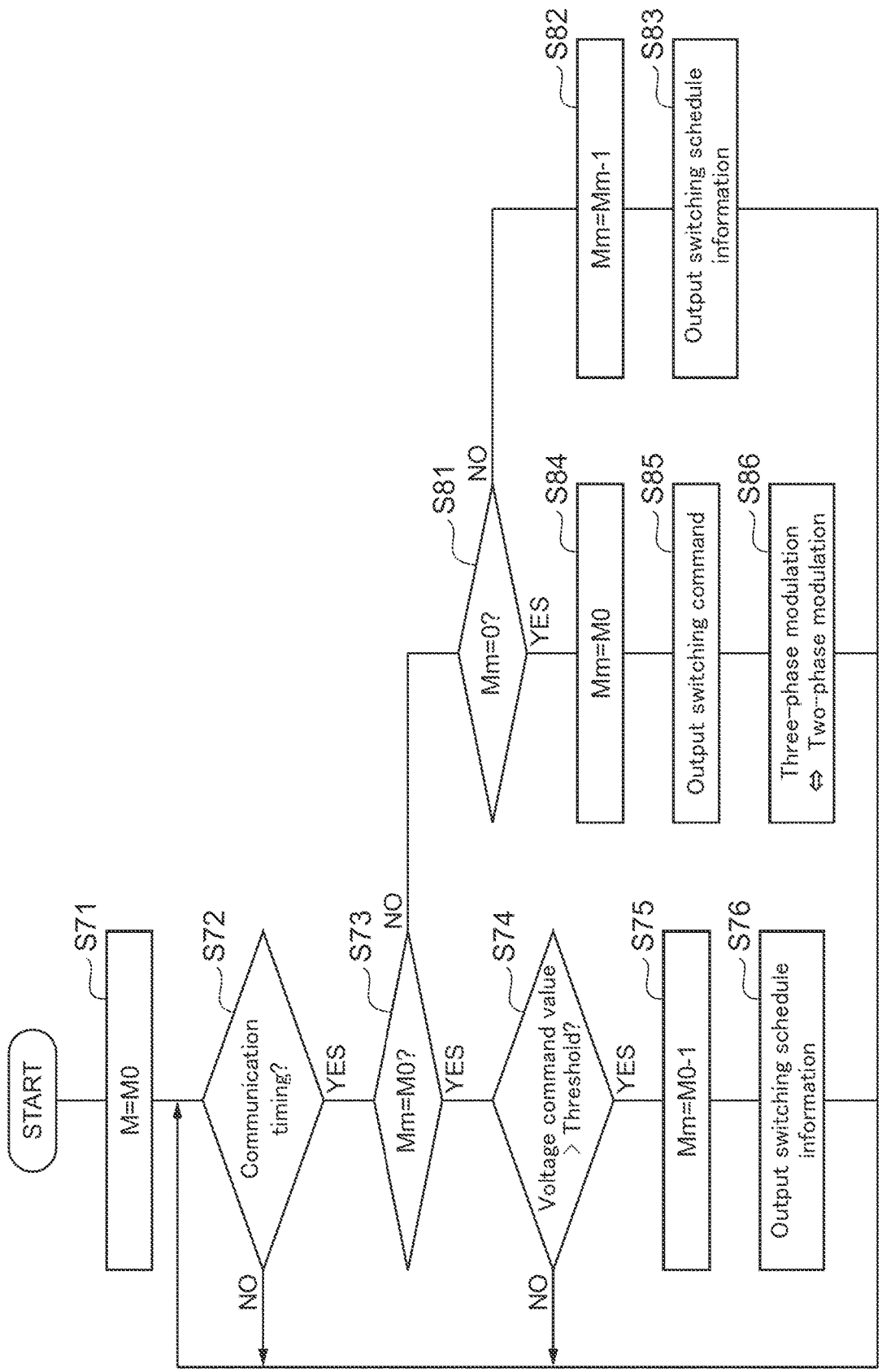
FIG. 11 is a flowchart illustrating a modulation scheme switching procedure on the master side.

The scheme switching procedure of the master-side power conversion device 2 includes outputting information indicating the timing of scheme switching to the slave-side power conversion device 2. FIG. 11 illustrates a switching procedure between a three-phase modulation control (full modulation control) and a two-phase modulation control (partial modulation control). For example, as illustrated in FIG. 11, the control circuit 100 executes Steps S71, S72, and S73. In Step S71, the switching information output part 165 sets the number of repetitions (Mm) of information transmission to the slave-side power conversion device 2 to the initial value (M0). In Step S72, the switching information output part 165 waits for a communication timing. In Step S73, the switching information output part 165 confirms whether or not the number of repetitions (Mm) is the initial value (M0).

When it is determined in Step S73 that the number of repetitions (Mm) is the initial value (M0), the control circuit 100 executes Step S74. In Step S74, the modulation scheme switching part 163 confirms whether or not the voltage command value exceeds a scheme switching threshold. When it is determined in Step S74 that the voltage command value does not exceed the scheme switching threshold, the control circuit 100 returns the process to Step S72. After that, the confirmation of the voltage command value is repeated until the voltage command value exceeds the scheme switching threshold.

When it is determined in Step S74 that the voltage command value exceeds the scheme switching threshold, the control circuit 100 executes Steps S75 and S76. In Step S75, the switching information output part 165 counts down the number of repetitions (Mm) by one. In Step S76, the switching information output part 165 outputs the above-described scheme switching schedule information to the slave-side power conversion device 2. For example, the switching information output part 165 outputs the current value of the number of repetitions (Mm) as the above-described scheme switching schedule information. The current value of the number of repetitions (Mm) corresponds to information notifying that a scheme switching command is output at the time of communication after Mm times. After that, the control circuit 100 returns the process to Step S72.

When it is determined in Step S73 that the number of repetitions (Mm) is not the initial value (M0), the control circuit 100 executes Step S81. In Step S81, the switching information output part 165 confirms whether or not the number of repetitions (Mm) is zero.

When it is determined in Step S81 that the number of repetitions (Mm) is not zero, the control circuit 100 executes Steps S82 and S83. In Step S82, the switching information output part 165 counts down the number of repetitions (Mm) by one. In Step S83, the switching information output part 165 outputs the above-described scheme switching schedule information to the slave-side power conversion device 2. For example, the switching information output part 165 outputs the current value of the number of repetitions (Mm) as the above-described scheme switching schedule information. After that, the control circuit 100 returns the process to Step S72. After that, until the number of repetitions (Mm) becomes zero, the countdown of the number of repetitions (Mm) and the output of the scheme switching schedule information are repeated.

When it is determined in Step S81 that the number of repetitions (Mm) is zero, the control circuit 100 executes Steps S84, S85, and S86. In Step S84, the switching information output part 165 resets the number of repetitions (Mm) to the initial value (M0). In Step S85, the switching information output part 165 outputs the above-described scheme switching command. In Step S86, the modulation scheme switching part 163 performs scheme switching between a three-phase modulation control (full modulation control) and a two-phase modulation control (partial modulation control). After that, the control circuit 100 returns the process to Step S72. After that, the above procedure is repeated.

Slave-Side Scheme Switching Procedure

Figure 12:
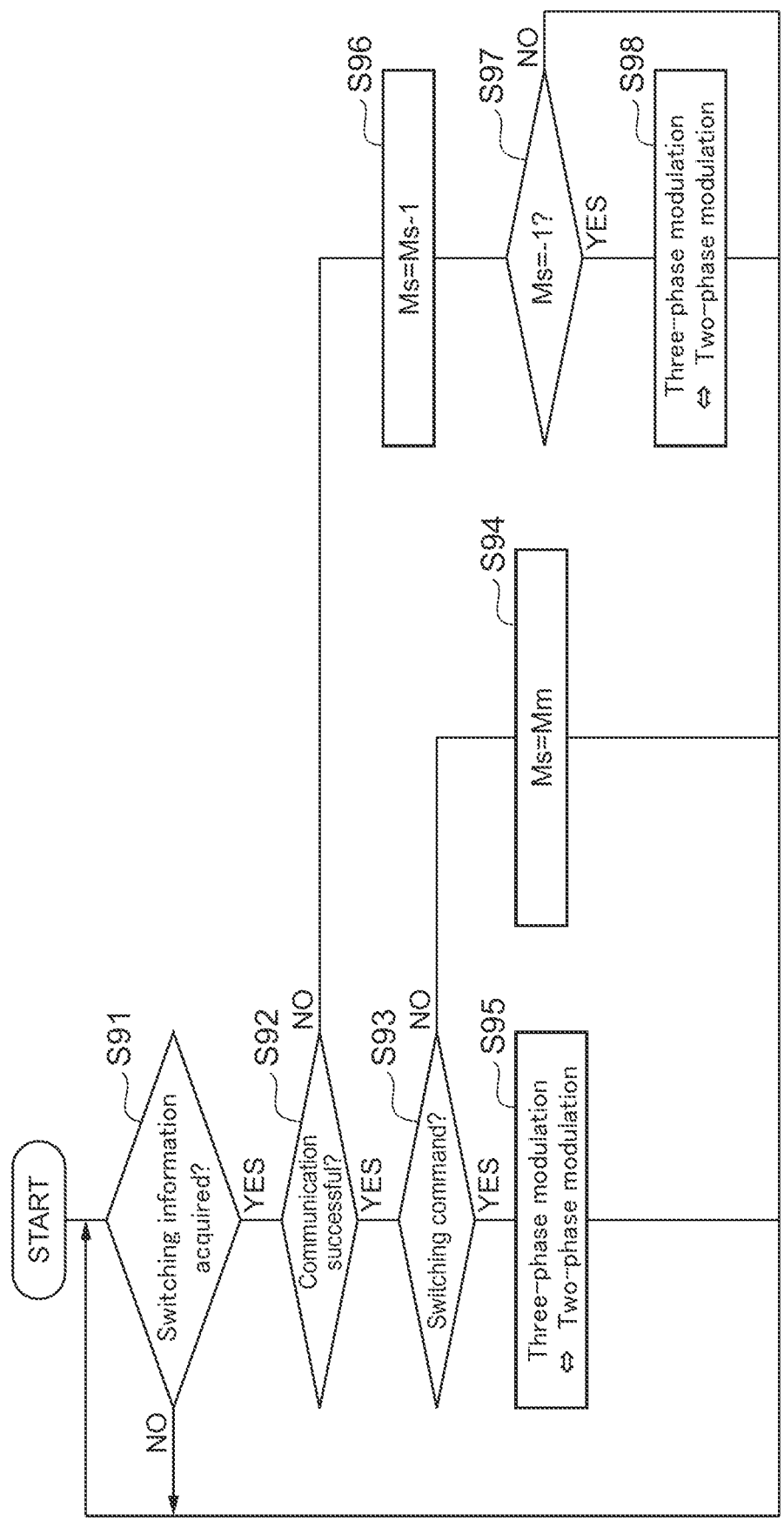
FIG. 12 is a flowchart illustrating a modulation scheme switching procedure on the slave side.

The scheme switching procedure of the slave-side power conversion device 2 includes performing scheme switching based on the timing at which the master-side power conversion device 2 performs scheme switching. For example, as illustrated in FIG. 12, the control circuit 100 executes Steps S91 and S92. In Step S91, the switching information acquisition part 166 waits for information about the timing of scheme switching. In Step S92, the switching information acquisition part 166 confirms whether or not communication is successful. The success or failure of communication can be confirmed by using, for example, a parity bit or the like.

When it is determined in Step S92 that communication is successful, the control circuit 100 executes Step S93. In Step S93, the modulation scheme switching part 163 confirms whether or not the information about the timing of scheme switching is a scheme switching command.

When it is determined in Step S93 that the information about the timing of scheme switching is not a scheme switching command, the control circuit 100 executes Step S94. In Step S94, the modulation scheme switching part 163 sets the number of repetitions (Ms) of information reception from the master-side power conversion device 2 to the above-described number of repetitions (Mm). After Step S94, the control circuit 100 returns the process to Step S91. After that, every time the reception of the scheme switching schedule information is successful, update of the number of repetitions (Ms) based on the scheme switching schedule information is repeated.

When it is determined in Step S93 that the information about the timing of scheme switching is a scheme switching command, the control circuit 100 executes Step S95. In Step S95, the modulation scheme switching part 163 immediately performs scheme switching. After that, the control circuit 100 returns the process to Step S91.

When it is determined in Step S92 that communication is not successful, the control circuit 100 executes Steps S96 and S97. In Step S96, the modulation scheme switching part 163 counts down the number of repetitions (Ms) by one. In Step S97, the modulation scheme switching part 163 confirms whether or not the number of repetitions (Ms) is −1.

When it is determined in Step S97 that the number of repetitions (Ms) is not −1, the control circuit 100 returns the process to Step S91.

When it is determined in Step S97 that the number of repetitions (Ms) is −1, the control circuit 100 executes Step S98. In Step S98, the modulation scheme switching part 163 immediately performs scheme switching. After that, the control circuit 100 returns the process to Step S91. After that, the above procedure is repeated.

According to the above procedure, when the scheme switching schedule information is successfully received even once and the number of repetitions (Ms) of information reception is set to the number of repetitions (Mm) of information transmission in Step S94, the scheme switching is performed according to the scheme switching schedule information by counting down the number of repetitions (Ms). Therefore, it is possible to perform scheme switching with high reliability according to the timing of scheme switching on the master side.

2. Second Embodiment

2.1 Power Conversion Device

Figure 13:
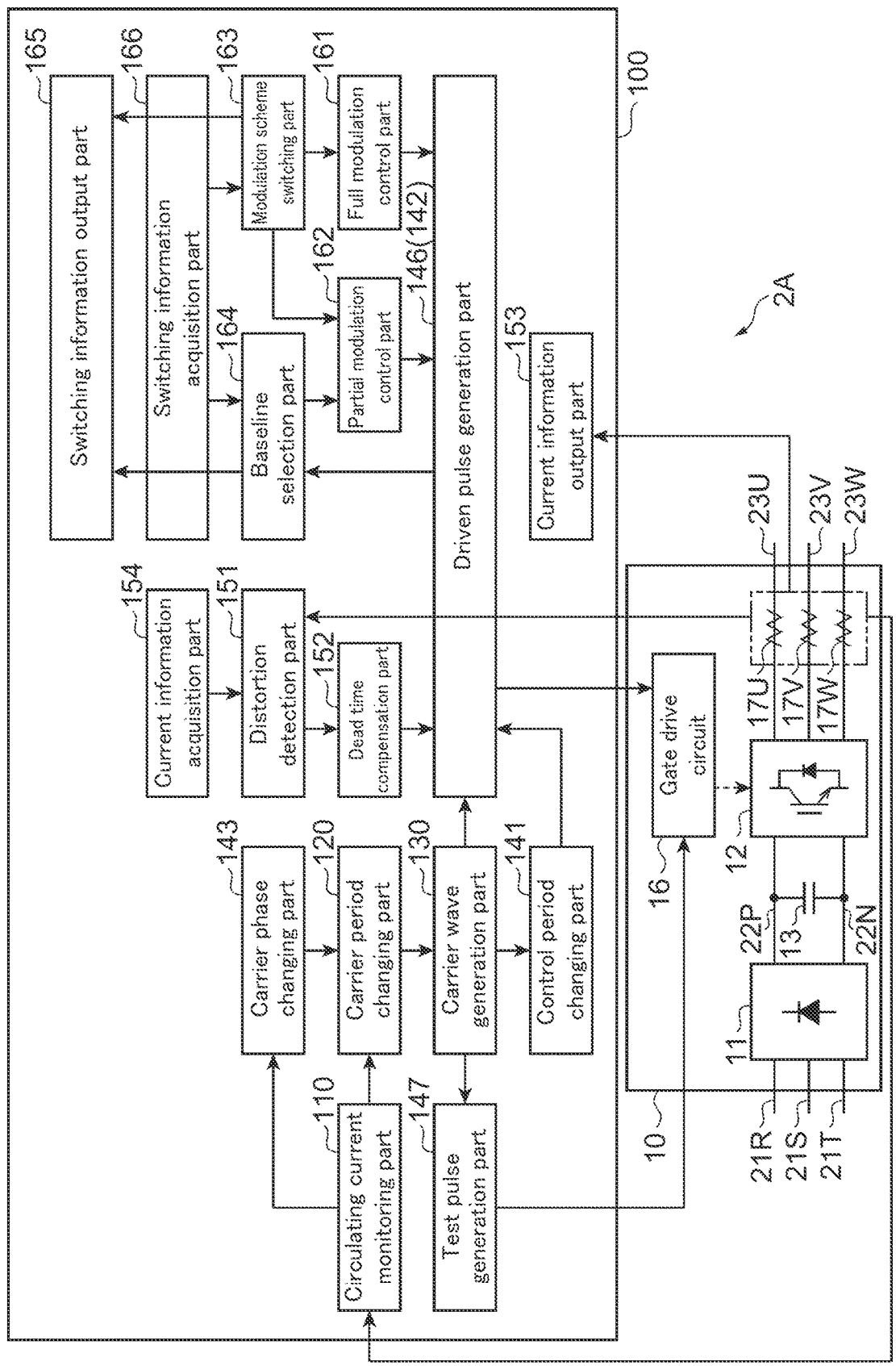
FIG. 13 is a schematic diagram illustrating a structure of a power conversion device according to a second embodiment.

A power conversion device (2A) according to a second embodiment performs carrier wave phase adjustment before the start of drive power generation with a scheme different from that of the power conversion device 2 according to the first embodiment. As illustrated in FIG. 13, the control circuit 100 of the power conversion device (2A) does not include the phase information output part 144 and the phase information acquisition part 145. In the control circuit 100 of the power conversion device (2A), the pulse generation part 142 further includes a test pulse generation part 147.

The test pulse generation part 147 generates a pulse signal for test power output (hereinafter, this pulse signal is referred to as a "test pulse signal") having a smaller width as compared to a pulse signal for drive power output. The width of the test pulse signal is set to a width and an operation pattern such that the test pulse signal substantially does not operate the load (LD).

The carrier phase changing part 143 of the power conversion device (2A) changes the phase of a carrier wave such that the phase difference is reduced based on a monitoring value acquired by the circulating current monitoring part 110 while the inverter circuit 12 is generating test power (hereinafter, this monitoring value is referred to as the "monitoring value during testing"). For example, the carrier phase changing part 143 requests the carrier period changing part 120 to change the above-described compare match count value based on the monitoring value during testing. The carrier period changing part 120 calculates a count correction value based on the monitoring value during testing, and corrects the compare match count value by adding the count correction value to the reference count value. As a result, as described above in the description of the carrier period changing part 120, the period of the carrier wave at a peak is changed, and the phase of a subsequent peak is adjusted.

When the monitoring value during testing is smaller than a value required for determining the necessity of carrier wave phase changing, the carrier phase changing part 143 may change the phase of the carrier wave so as to increase the monitoring value during testing. As illustrated in FIG. 4(*e*), the monitoring value is zero when the phase difference is zero. However, the monitoring value is also zero when the phase difference is 180 degrees. Therefore, when the phase difference is zero, the necessity of phase changing cannot be determined based only on the monitoring value. In such a case, by intentionally changing the phase of the carrier wave and increasing the monitoring value during testing, a positive or negative sign of the monitoring value during testing becomes clear, and carrier wave phase changing for reducing the circulating current becomes possible.

When the monitoring value during testing is smaller than the value required for determining the necessity of carrier wave phase changing, the carrier phase changing part 143 may reacquire a monitoring value during testing by shifting a current measurement timing from peaks and bottoms of the carrier wave and determine the necessity of phase changing according to a change in the monitoring value during testing. When the phase difference is zero, a change does not occur in the monitoring value during testing even when the current measurement timing is shifted. On the other hand, when the phase difference is 180 degrees, the monitoring value during testing changes according to the shift in the current measurement timing. Therefore, the necessity of carrier wave phase changing can be determined based on the change in the monitoring value during testing according to the change in the measurement timing. This is clear from that the zero-phase current is not zero except at points P1 and P2 at a left or right end of the graph of FIG. 4 (*d*).

2.2 Power Conversion Method

Figure 14:
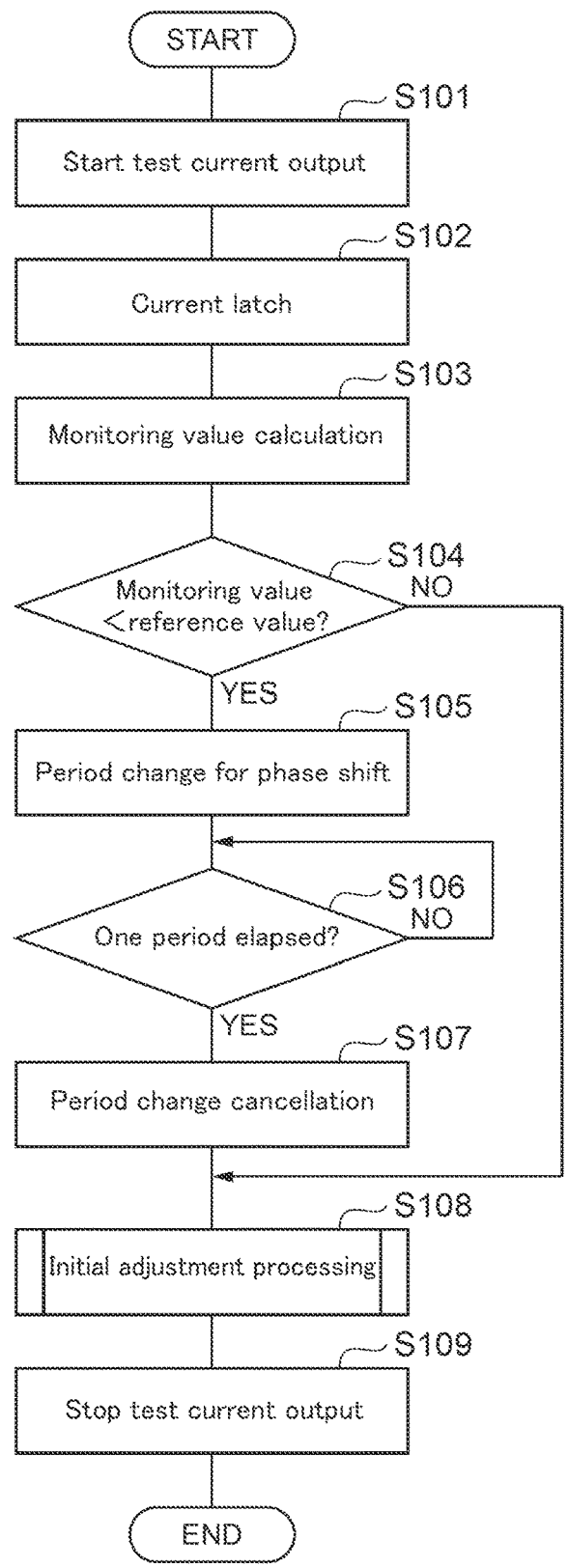
FIG. 14 is a flowchart illustrating a modified example of a carrier wave phase adjustment procedure before the start of a drive power output.

FIG. 14 is a flowchart illustrating a phase adjustment procedure of the power conversion device (2A).

As illustrated in FIG. 14, the control circuit 100 executes Steps S101, S102, S103, and S104. In Step S101, the test pulse generation part 147 starts to generate a pulse signal for test power output in synchronization with a carrier wave and output the pulse signal to the gate drive circuit 16. As a result, the inverter circuit 12 starts to output test power according to the width of the pulse signal. In Step S102, the circulating current monitoring part 110 acquires and holds the above-described peak U-phase current value, the above-described peak V-phase current value, the above-described peak W-phase current value, the above-described bottom U-phase current value, the above-described bottom V-phase current value, and the above-described bottom W-phase current value. In Step S103, the circulating current monitoring part 110 calculates a monitoring value during testing by summing up a difference between the peak U-phase current value and the bottom U-phase current value, a difference between the peak V-phase current value and the bottom V-phase current value, and a difference between the peak W-phase current value and the bottom W-phase current value. In Step S104, the carrier phase changing part 143 confirms whether or not the monitoring value during testing is smaller than a predetermined reference value. The reference value is a value required for the necessity of carrier wave phase changing.

When it is determined in Step S104 that the monitoring value during testing is smaller than the predetermined reference value, the control circuit 100 executes Steps S105, S106, and S107. In Step S105, the carrier phase changing part 143 requests the carrier period changing part 120 to change the compare match count value by adding a count correction value preset for phase changing to the above-described reference count value. In Step S106, the carrier phase changing part 143 waits for the passage of the carrier period. In Step S107, the carrier phase changing part 143 requests the carrier period changing part 120 to reset the compare match count value to the reference count value.

Next, the control circuit 100 executes Steps S108 and S109. When it is determined in Step S104 that the monitoring value during testing is not smaller than the predetermined reference value, the control circuit 100 executes Steps S108 and S109 without executing Steps S105, S106 and S107. In Step S108, the carrier phase changing part 143 changes the phase of the carrier wave such that the phase difference is reduced based on the monitoring value during testing. Specific processing content will be described later. In Step S109, the test pulse generation part 147 stops outputting to the gate drive circuit 16 the pulse signal for test power output. As a result, the phase adjustment procedure is completed.

Figure 15:
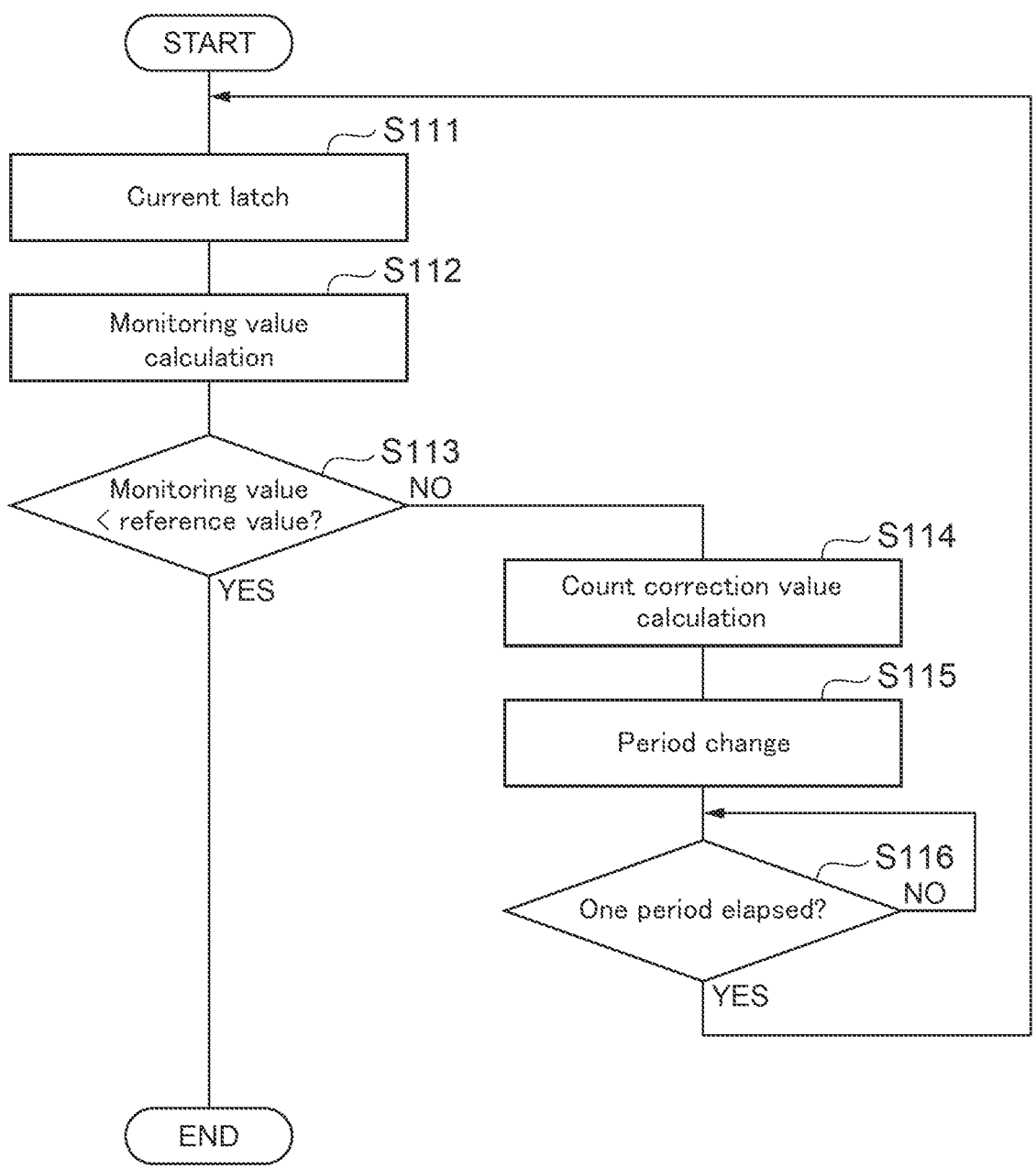
FIG. 15 is a flowchart illustrating a carrier wave phase adjustment procedure based on a circulating current.

FIG. 15 is a flowchart illustrating the carrier wave phase changing procedure in Step S108. As illustrated in FIG. 15, the control circuit 100 executes Steps S111, S112, and S113. In Step S111, the circulating current monitoring part 110 acquires and holds the above-described peak U-phase current value, the above-described peak V-phase current value, the above-described peak W-phase current value, the above-described bottom U-phase current value, the above-described bottom V-phase current value, and the above-described bottom W-phase current value. In Step S112, the circulating current monitoring part 110 calculates a monitoring value during testing by summing up a difference between the peak U-phase current value and the bottom U-phase current value, a difference between the peak V-phase current value and the bottom V-phase current value, and a difference between the peak W-phase current value and the bottom W-phase current value. In Step S113, the carrier phase changing part 143 confirms whether or not the monitoring value during testing is smaller than the above-described reference value.

When it is determined in Step S113 that the monitoring value during testing is smaller than the reference value, the control circuit 100 executes Steps S114, S115, and S116. In Step S114, the carrier phase changing part 143 requests the carrier period changing part 120 to calculate a count correction value based on the monitoring value during testing. In Step S115, the carrier phase changing part 143 requests the carrier period changing part 120 to change the compare match count value by adding the count correction value to the above-described reference count value. As a result, the carrier period is changed. In Step S116, the carrier phase changing part 143 waits for the passage of the carrier period. After that, the control circuit 100 returns the process to Step S111. After that, changing the carrier cycle is repeated until the monitoring value during testing becomes smaller than the reference value. When it is determined in Step S113 that the monitoring value during testing is smaller than the reference value, the control circuit 100 ends the process. As a result, the carrier wave phase changing procedure is completed.

Figure 16:
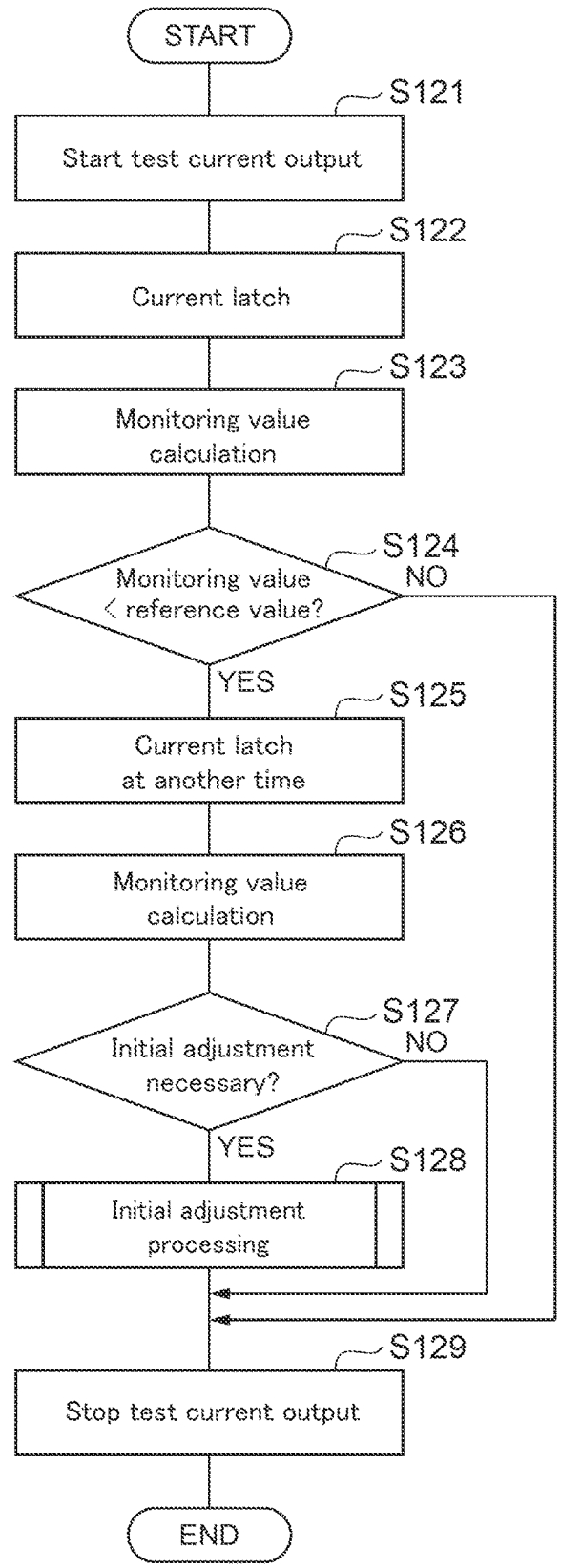
FIG. 16 is a flowchart illustrating another modified example of a carrier wave phase adjustment procedure before the start of a drive power output.

FIG. 16 is a flowchart illustrating a modified example of the phase adjustment procedure of the power conversion device (2A). As illustrated in FIG. 16, the control circuit 100 executes Steps S121, S122, S123, and S124. In Steps S121-S124, the control circuit 100 executes the same process as Steps S101-S104.

When it is determined in Step S124 that the monitoring value during testing is smaller than the predetermined reference value, the control circuit 100 executes Steps S125 and S126. In Step S125, the carrier phase changing part 143 shifts a current measurement timing from peaks and bottoms of the carrier wave. Hereinafter, a measurement timing shifted from a bottom is referred to as a "first timing," and a measurement timing shifted from a peak is referred to as a "second timing." The carrier phase changing part 143 requests the circulating current monitoring part 110 to acquire and hold a U-phase current value at the first timing, a V-phase current value at the first timing, a W-phase current value at the first timing, a U-phase current value at the second timing, a V-phase current value at the second timing, and a W-phase current value at the second timing. In Step S126, the carrier phase changing part 143 requests the circulating current monitoring part 110 to calculate a monitoring value during testing by summing up a difference between the U-phase current value at the first timing and the U-phase current value at the second timing, a difference between the V-phase current value at the first timing and the V-phase current value at the second timing, and a difference between the W-phase current value at the first timing and the W-phase current value at the second timing.

Next, the control circuit 100 executes Step S127. In Step S127, the carrier phase changing part 143 confirms the necessity of carrier wave phase changing based on the monitoring value during testing calculated in Step S126 and the monitoring value during testing calculated in Step S123. For example, when a difference between the monitoring value during testing calculated in Step S126 and the monitoring value during testing calculated in Step S123 is larger than a predetermined threshold, the carrier phase changing part 143 determines that phase changing is necessary, and when the difference is smaller than the threshold, the carrier phase changing part 143 determines that phase changing is not necessary.

When it is determined in Step S127 that carrier wave phase changing is necessary, the control circuit 100 executes Step S128. In Step S128, similar to Step S108, the carrier phase changing part 143 changes the phase of the carrier wave such that the phase difference is reduced based on the monitoring value during testing.

Next, the control circuit 100 executes Step S129. When it is determined in Step S127 that carrier wave phase changing is not necessary, the control circuit 100 executes Step S129 without executing Step S128. In Step S129, similar to Step S109, the test pulse generation part 147 stops outputting to the gate drive circuit 16 the pulse signal for test power output. As a result, the phase adjustment procedure is completed.

As described above, the power conversion device (2, 2A) according to the embodiments, in one aspect, is connected in parallel to the other power conversion device (2, 2A) and includes: the carrier wave generation part 130 to generate a carrier wave; the pulse generation part 142 that generates a pulse signal synchronized with the carrier wave; the inverter circuit 12 that generates power according to a width of the pulse signal; the circulating current monitoring part 110 that acquires a monitoring value corresponding to a circulating current between this power conversion devices (2, 2A) and the other power conversion device (2, 2A); and the carrier period changing part 120 that changes a period of the carrier wave generated by the carrier wave generation part 130 so as to reduce the circulating current based on the monitoring value acquired by the circulating current monitoring part 110 while the inverter circuit 12 is generating drive power.

According to this structure, carrier wave synchronization is achieved based on the circulating current, and thus, real-time synchronization processing can be continued without relying on communication performance. Further, since the period of the carrier wave is changed in order achieve carrier wave synchronization, it is easy to maintain the synchronization state after synchronization is achieved once. Therefore, it is effective in suppressing the circulating current caused by a carrier wave phase difference.

The power conversion device (2, 2A) may further include the control period changing part 141 that changes a control period of the inverter circuit 12 according to the change of the carrier wave period by the carrier period changing part 120 such that the carrier wave period and the control period are synchronized, and the pulse generation part 142 may adjust the width of the pulse signal at a timing according to the control period. In this case, by synchronizing the pulse width adjustment timing along with the carrier wave synchronization, the circulating current can be more reliably suppressed.

The circulating current monitoring part 110 may acquire as a monitoring value a difference between currents generated by the inverter circuit 12 at a first timing and a second timing set within one period of the carrier wave. In this case, the synchronization process can be quickly performed with simple calculation.

The circulating current monitoring part 110 may acquire as a monitoring value a difference between currents generated by the inverter circuit 12 at the first timing and the second timing, which have a phase difference of half the period of the carrier wave. In this case, since the circulating current can be detected with a higher sensitivity, the circulating current can be more reliably suppressed.

The circulating current monitoring part 110 may acquire as a monitoring value a difference between currents generated by the inverter circuit 12 at a timing corresponding to a peak of the carrier wave and a timing corresponding to a bottom of the carrier wave as the difference between the currents generated by the inverter circuit 12 at the first timing and the second timing. In this case, since the circulating current can be detected with a higher sensitivity with less possibility of being affected by noise due to switching, the circulating current can be more reliably suppressed.

The power conversion device (2, 2A) may further include the carrier phase changing part 143 that changes the phase of the carrier wave such that the carrier wave phase difference between this power conversion device (2, 2A) and the other power conversion device (2, 2A) is reduced before the inverter circuit 12 starts generating drive power. In this case, since the carrier wave period adjustment by the carrier period changing part 120 can be started in a state in which the carrier wave phase difference has been reduced, the carrier wave synchronization can be more quickly achieved.

The carrier phase changing part 143 may change the phase of the carrier wave such that the phase difference is reduced to less than half the period of the carrier wave. In this case, the carrier wave synchronization can be more quickly achieved.

The power conversion device 2 may further include the phase information acquisition part 145 that acquires the phase information corresponding to the phase of the carrier wave in the other power conversion device 2, and the carrier phase changing part 143 may change the phase of the carrier wave such that the phase difference is reduced based on the phase information acquired by the phase information acquisition part 145. In this case, since the carrier wave phase difference can be reduced by communication, occurrence of a circulating current in a process of reducing the phase difference can be easily suppressed by reducing the phase difference in a state in which power is not generated.

The pulse generation part 142 may include the drive pulse generation part 146 that generates a pulse signal for drive power output, and the test pulse generation part 147 that generates a pulse signal for test power output having a smaller width as compared to the pulse signal for drive power output, and the carrier phase changing part 143 may change the phase of the carrier wave such that the phase difference is reduced based on the monitoring value acquired by the circulating current monitoring part 110 while the inverter circuit 12 is generating test power. In this case, since power is reduced when the carrier wave phase difference is reduced, occurrence of a circulating current in the process of reducing the phase difference can be suppressed.

The carrier phase changing part 143 may change the phase of the carrier wave so as to increase the monitoring value when the monitoring value is smaller than a value required for determining the necessity of carrier wave phase changing. In this case, the circulating current and the phase difference can be more quickly reduced. In particular, depending on the magnitude of the phase difference, a difference between currents generated by the power conversion part at the above-described first timing and the above-described second timing may be the same as that when there is no phase difference. Even in such a situation, presence or absence of a phase difference can be detected and the phase difference can be quickly reduced.

The power conversion device (2, 2A) may include the distortion detection part 151 that detects a current or voltage distortion caused by a dead time of the inverter circuit 12 based on one current index value corresponding to a current output by the inverter circuit 12 and a current output by the inverter circuit 12 of the other power conversion device, and the dead time compensation part 152 that corrects the width of the pulse signal according to the current or voltage distortion detected by distortion detection part 151. In this case, an increase in a circulating current caused by dead time compensation can be suppressed.

The power conversion device (2, 2A) according to the embodiments, in another aspect, is connected in parallel to the other power conversion device (2, 2A) and includes: the inverter circuit 12 that performs power conversion by changing a connection state between the multiple lines (22P, 22N) on the primary side and the multiple lines (23U, 23V, 23W) on the secondary side; the baseline selection part 164 that selects one of the secondary lines (23U, 23V, 23W) as the baseline; and the partial modulation control part 162 that controls the inverter circuit 12 so as to maintain a state in which the baseline is connected to one of the lines (22P, 22N) on the primary side and to change a connection state between the other lines (23U, 23V, 23W) on the secondary side and the multiple lines (22P, 22N) on the primary side. The baseline selection part 164 switches a line (23U, 23V, 23W) to be selected as the baseline based on a switching timing of a line (23U, 23V, 23W) to be selected as the baseline by the baseline selection part of the other power conversion device (2, 2A).

Partial modulation control is effective in reducing a switching loss. However, when partial modulation is performed in parallel operation, a circulating current may occur due to the baseline switching timing. On the other hand, according to this structure, since the base switching part of the power conversion device performs baseline switching in synchronization with the base switching part of the other power conversion device, it is possible to adopt partial modulation control while suppressing the occurrence of a circulating current. Therefore, it is effective in reducing a switching loss.

The power conversion device (2, 2A) may further include the switching information acquisition part 166 that acquires information about a scheduled timing for switching a line (23U, 23V, 23W) to be selected as the baseline by the baseline selection part 164 of the other power conversion device (2, 2A), and the baseline selection part 164 may switch a line to be selected as the baseline when the scheduled timing acquired by the switching information acquisition part is reached. In this case, by sharing the scheduled timing before baseline switching, more reliable synchronization can be achieved.

The power conversion device (2, 2A) may further include: the pulse generation part 142 that generates, in synchronization with a carrier wave, a pulse signal that causes the inverter circuit 12 to change a connection state between the multiple lines (22P, 22N) on the primary side and the multiple lines (23U, 23V, 23W) on the secondary side; the circulating current monitoring part 110 that acquires a monitoring value corresponding to a circulating current between this power conversion device (2, 2A) and the other power conversion device (2, 2A); and the carrier period changing part 120 that changes at least one of a phase and a period of the carrier wave so as to reduce the circulating current based on the monitoring value acquired by the circulating current monitoring part 110. In this case, a circulating current can be more reliably suppressed.

In the embodiments, as an example of a carrier wave changing part, the carrier period changing part 120 that changes the period of the carrier wave is described. However, the present invention is not limited to this. It is also possible that the carrier wave changing part is structured to change the phase of the carrier wave.

The pulse generation part 142 may adjust the width of the pulse signal at a timing according to the control period synchronized with the carrier wave, and the baseline selection part 164 may switch a line to be selected as the baseline at the timing according to the control period. In this case, along with the carrier wave synchronization, the pulse width adjustment timing can also be synchronized. Further, along with the carrier wave synchronization, the baseline switching timing can also be more reliably synchronized. Therefore, a circulating current can be more reliably suppressed.

The power conversion device (2, 2A) may further include: the full modulation control part 161 that controls the inverter circuit 12 so as to change a connection state between all the lines (23U, 23V, 23W) on the secondary side and the multiple lines (22P, 22N) on the primary side; and the modulation scheme switching part 163 that switches a modulation scheme of the inverter circuit 12 to either the modulation of the partial modulation control part 162 or the modulation of the full modulation control part 161, and the modulation scheme switching part 163 may switch the modulation scheme based on a timing at which the modulation scheme switching part 163 of the other power conversion device (2, 2A) switches the modulation scheme. In this case, a circulating current caused by a shift in modulation scheme switching timing can also be suppressed.

The power conversion system 1 may include at least two power conversion devices (2, 2A) including the above-described power conversion device (2, 2A) and the above-described other power conversion device (2, 2A). The baseline selection part 164 of the other power conversion device (2, 2A) may switch a line to be selected as the baseline based on a phase of a voltage command value on the secondary side. In this case, in both the above-described power conversion device (2, 2A) and the above-described other power conversion device (2, 2A), baseline switching can be performed at an appropriate timing according to a change in voltage on the secondary side.

The power conversion device (2, 2A) according to the embodiments, in yet another aspect, includes: the carrier wave generation part 130 that generates a carrier wave; the pulse generation part 142 that generates a pulse signal synchronized with the carrier wave; the inverter circuit 12 that generates power according to a width of the pulse signal; the distortion detection part 151 that detects a current or voltage distortion caused by a dead time of the inverter circuit 12 based on one current index value corresponding to a current output by the inverter circuit 12 of this device and a current output by the inverter circuit 12 of the other device; and the dead time compensation part 152 that corrects the width of the pulse signal according to the current or voltage distortion detected by the distortion detection part.

A circulating current can occur between this device and the other device. When a circulating current occurs, a slight difference occurs between an output current of this device and an output current of the other device. Therefore, when dead time compensation is individually performed based on an individual current detection result, a difference in pulse signal width caused by a difference in compensation level may occur, resulting in an increase in circulating current. When the circulating current increases, the difference in compensation level in dead time compensation also further increases. In this way, there is a risk that a negative synergistic effect may occur and the circulating current may increase. In contrast, according to the present structure, since dead time compensation is performed in both inverter circuits 12 based on one current index value, the increase in circulating current caused the difference in compensation level and the above-described negative synergistic effect are suppressed.

A power conversion device according to an embodiment of the present invention is effective in reducing a switching loss in multiple power conversion devices connected in parallel with each other and is effective in suppressing a circulating current flowing between the multiple power conversion devices.

A power conversion device according to one aspect of the present invention is connected in parallel to another power conversion device, and includes: a power conversion part that performs power conversion by changing a connection state between multiple lines on a primary side and multiple lines on a secondary side; a baseline selection part that selects one of the lines on the secondary side as a baseline; and a partial modulation control part that controls the power conversion part so as to maintain a state in which the baseline is connected to one of the lines on the primary side and to change a connection state between the other lines on the secondary side and the multiple lines on the primary side. The baseline selection part switches a line to be selected as the baseline based on a switching timing of a line to be selected as the baseline by the baseline selection part of the other power conversion device.

A power conversion system according to another aspect of the present invention includes at least two power conversion devices including the above-described power conversion device and the above-described other power conversion device.

A power conversion method according to yet another aspect of the present invention includes: in a power conversion device connected in parallel to another power conversion device, performing power conversion by causing a power conversion part to change a connection state between multiple lines on a primary side and multiple lines on a secondary side; selecting one of the lines on the secondary side as a baseline; and causing the power conversion part to perform partial modulation in which a state in which the baseline is connected to one of the lines on the primary side is maintained and a connection state between the other lines on the secondary side and the multiple lines on the primary side is changed. A line to be selected as the baseline is switched based on a switching timing of a line to be selected as the baseline by the other power conversion device.

A power conversion device according to an embodiment of the present invention is effective in reducing a switching loss in multiple power conversion devices connected in parallel with each other and is effective in suppressing a circulating current flowing between the multiple power conversion devices.

Obviously, numerous modifications and variations of the present invention are possible in light of the above teachings. It is therefore to be understood that within the scope of the appended claims, the invention may be practiced otherwise than as specifically described herein.

What is claimed is:

1. A power conversion device connected in parallel to a second power conversion device, comprising:
    power conversion circuitry configured to perform power conversion by changing a connection state between first multiple lines on a primary side and second multiple lines on a secondary side;
    baseline selection circuitry configured to select one of the second multiple lines on the secondary side as a baseline;
    partial modulation control circuitry configured to control the power conversion circuitry to maintain a state in which the baseline is connected to one of the first multiple lines on the primary side and to change a connection state between other second multiple lines on the secondary side and the first multiple lines on the primary side,
    wherein the baseline selection circuitry is further configured to switch a line selected as the baseline based on a switching timing used by second baseline selection circuitry of the second power conversion device to select a second baseline;
    pulse generation circuitry configured to generate, in synchronization with a carrier wave, a pulse signal that causes the power conversion circuitry to change the connection state between the first multiple lines on the primary side and the second multiple lines on the secondary side;
    circulating current monitoring circuitry configured to acquire a monitoring value corresponding to a circulating current between the power conversion device and the second power conversion device; and
    carrier wave changing circuitry configured to change at least one of a phase and a period of the carrier wave to reduce the circulating current based on the monitoring value acquired by the circulating current monitoring circuitry.

2. The power conversion device according to claim 1, further comprising:
    switching information acquisition circuitry configured to acquire information about a scheduled timing used by the second baseline selection circuitry of the second power conversion device,
    wherein the baseline selection circuitry is further configured to switch the line selected as the baseline when the scheduled timing acquired by the switching information acquisition circuitry is achieved.

3. The power conversion device according to claim 1, wherein the pulse generation circuitry is further configured to adjust a width of the pulse signal at a timing corresponding to a control cycle synchronized with the carrier wave, and the baseline selection circuitry is further configured to switch the line selected as the baseline at the timing corresponding to the control cycle.

4. The power conversion device according to claim 1, further comprising:
full modulation control circuitry configured to control the power conversion circuitry to change the connection state between the second multiple lines on the secondary side and the first multiple lines on the primary side; and
a modulation scheme switching circuitry configured to switch a modulation scheme of the power conversion circuitry to either modulation by the partial modulation control circuitry or modulation by the full modulation control circuitry,
wherein the modulation scheme switching circuitry is further configured to switch the modulation scheme based on a timing at which second modulation scheme switching circuitry of the second power conversion device switches the modulation scheme.

5. A power conversion system, comprising:
at least two power conversion devices including the power conversion device of claim 1 and the second power conversion device.

6. The power conversion system according to claim 5, wherein the second baseline selection circuitry of the second power conversion device switches the line selected as the baseline based on a phase of a voltage command value on the secondary side.

7. The power conversion system according to claim 5, wherein the second baseline selection circuitry of the second power conversion device switches the line selected as the baseline based on a phase of a current command value on the secondary side.

8. A power conversion method, comprising:
in a first power conversion device connected in parallel to a second power conversion device, performing power conversion by causing power conversion circuitry to change a connection state between first multiple lines on a primary side and second multiple lines on a secondary side;
selecting one of the second multiple lines on the secondary side as a baseline; and
causing the power conversion circuitry to perform partial modulation including maintaining a state in which the baseline is connected to one of the first multiple lines on the primary side and changing a connection state between other second multiple lines on the secondary side and the first multiple lines on the primary side,
wherein the selecting comprises switching a first line selected as the baseline based on a switching timing of a second line selected as a second baseline by the second power conversion device;
generating, in synchronization with a carrier wave, a pulse signal that causes the power conversion circuitry to change the connection state between the first multiple lines on the primary side and the second multiple lines on the secondary side;
acquiring a monitoring value corresponding to a circulating current between the first power conversion device and the second power conversion device; and changing at least one of a phase and a period of the carrier wave to reduce the circulating current based on the acquired monitoring value.

9. The power conversion method according to claim 8, further comprising:
acquiring information about a scheduled timing of the second power conversion device,
wherein the selecting further comprises switching the line selected as the baseline when the acquired scheduled timing is achieved.

10. The power conversion method according to claim 8, further comprising:
adjusting a width of the pulse signal at a timing corresponding to a control cycle synchronized with the carrier wave,
wherein the selecting further comprises switching the line selected as the baseline at the timing corresponding to the control cycle.

11. The power conversion method to claim 8, further comprising:
controlling the power conversion circuitry to change the connection state between the second multiple lines on the secondary side and the first multiple lines on the primary side; and
switching a modulation scheme of the power conversion circuitry to either partial modulation or full modulation,
wherein the switching the modulation scheme is based on a timing at which the second power conversion device switches the modulation scheme.

12. The power conversion method to claim 8, wherein the second power conversion device switches the line selected as the baseline based on a phase of a voltage command value on the secondary side.

13. The power conversion method to claim 8, wherein the second power conversion device switches the line selected as the baseline based on a phase of a current command value on the secondary side.

14. A non-transitory computer readable medium having stored thereon a program that when executed by processing circuitry causes the processing circuitry to implement a power conversion method comprising:
in a first power conversion device connected in parallel to a second power conversion device, instructing performance of power conversion by causing power conversion circuitry to change a connection state between first multiple lines on a primary side and second multiple lines on a secondary side;
instructing selection of one of the second multiple lines on the secondary side as a baseline;
causing the power conversion circuitry to perform partial modulation including maintaining a state in which the baseline is connected to one of the first multiple lines on the primary side and changing a connection state between other second multiple lines on the secondary side and the first multiple lines on the primary side,
wherein the selection comprises switching a first line selected as the baseline based on a switching timing of a second line selected as a second baseline by the second power conversion device;
instructing generation of, in synchronization with a carrier wave, a pulse signal that causes the power conversion circuitry to change the connection state between the first multiple lines on the primary side and the second multiple lines on the secondary side;
instructing acquisition of a monitoring value corresponding to a circulating current between the first power conversion device and the second power conversion device; and instructing change of at least one of a phase and a period of the carrier wave to reduce the circulating current based on the acquired monitoring value.

15. The non-transitory computer readable medium according to claim 14, wherein the method further comprises instructing acquisition of information about a scheduled timing of the second power conversion device, and the selection further comprises switching the line selected as the baseline when the acquired scheduled timing is achieved.

16. The non-transitory computer readable medium according to claim 7, wherein the method further comprises instructing adjustment of a width of the pulse signal at a timing corresponding to a control cycle synchronized with the carrier wave, and the selection further comprises switching the line selected as the baseline at the timing corresponding to the control cycle.

17. The non-transitory computer readable medium according to claim 14, wherein the method further comprises instructing control of the power conversion circuitry to change the connection state between the second multiple lines on the secondary side and the first multiple lines on the primary side, and instructing switching of a modulation scheme of the power conversion circuitry to either partial modulation or full modulation, and the switching the modulation scheme is based on a timing at which the second power conversion device switches the modulation scheme.

* * * * *